US012348286B2

(12) United States Patent
Stoica et al.

(10) Patent No.: US 12,348,286 B2
(45) Date of Patent: **\*Jul. 1, 2025**

(54) DETERMINING A PRECODER FOR WIRELESS COMMUNICATIONS

(71) Applicant: Lenovo (Singapore) Pte. Ltd., New Tech Park (SG)

(72) Inventors: Razvan-Andrei Stoica, Essen (DE); Seyedomid Taghizadeh Motlagh, Oberursel (DE); Vijay Nangia, Woodridge, IL (US); Ali Ramadan Ali, Munich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,083

(22) Filed: Nov. 22, 2023

(65) Prior Publication Data

US 2024/0097753 A1 Mar. 21, 2024

Related U.S. Application Data

(63) Continuation of application No. 17/508,228, filed on Oct. 22, 2021, now Pat. No. 11,863,259.

(51) Int. Cl.
*H04B 7/02* (2018.01)
*H04B 7/0456* (2017.01)

(52) U.S. Cl.
CPC ................... *H04B 7/0456* (2013.01)

(58) Field of Classification Search
CPC ............ H04B 7/0456; H04B 7/0617

(Continued)

(56) References Cited

U.S. PATENT DOCUMENTS

| 7,224,744 B2 | 5/2007 | Giannakis et al. |
| 8,085,819 B2 | 12/2011 | Kiran et al. |

(Continued)

FOREIGN PATENT DOCUMENTS

WO 2017096121 A1 6/2017

OTHER PUBLICATIONS

I. Darwazeh et al., "A Spectrally Efficient Frequency Division Multiplexing Based Communications System", ResearchGate Conference Paper, https://www.researchgate.net/publication/309373002, Sep. 2003, pp. 1-7.

(Continued)

*Primary Examiner* — Helene E Tayong
(74) *Attorney, Agent, or Firm* — Kunzler Bean & Adamson

(57) ABSTRACT

Apparatuses, methods, and systems are disclosed for determining a precoder for wireless communications. An apparatus is configured to determine a precoder for a set of modulation symbols representing at least two distinct multiplexed streams of information. The precoder includes a plurality of codewords and is configured to reduce an ensemble interference and a pairwise interference for the plurality of codewords. The apparatus is configured to precode the set of modulation symbols based on the precoder and map the precoded set of modulation symbols to a set of resources. The apparatus is configured to generate a non-orthogonal multiplexed channel for access to the resources by overloading the set of modulation symbols at a transmission rate that is greater than a Nyquist rate and transmit an indication of the precoder and the set of resources.

20 Claims, 12 Drawing Sheets

(58) Field of Classification Search
USPC .......................................................... 375/267
See application file for complete search history.

(56) References Cited

U.S. PATENT DOCUMENTS

| | | | |
|---|---|---|---|
| 8,121,235 | B1 | 2/2012 | Sun et al. |
| 8,264,946 | B2 | 9/2012 | Narasimha et al. |
| 9,294,175 | B2 | 3/2016 | Noh et al. |
| 9,407,344 | B2 * | 8/2016 | Ryu ...................... H04W 72/04 |
| 9,439,187 | B2 | 9/2016 | Gresset et al. |
| 9,680,578 | B2 | 6/2017 | Hwang et al. |
| 9,847,897 | B1 | 12/2017 | Cheng et al. |
| 9,942,013 | B2 | 4/2018 | Malladi et al. |
| 10,003,489 | B2 | 6/2018 | Zheng et al. |
| 10,051,634 | B2 | 8/2018 | Soriaga et al. |
| 10,193,715 | B2 | 1/2019 | Hasegawa |
| 2008/0152003 | A1 | 6/2008 | Oguz |
| 2010/0039928 | A1 | 2/2010 | Noh et al. |
| 2012/0219091 | A1 | 8/2012 | Li et al. |
| 2013/0028068 | A1 | 1/2013 | Park et al. |
| 2013/0039447 | A1 | 2/2013 | Lee et al. |
| 2014/0050279 | A1 * | 2/2014 | Kishiyama ............. H04J 11/004 375/350 |
| 2016/0191174 | A1 | 6/2016 | Hwang et al. |
| 2018/0213591 | A1 | 7/2018 | Kowalski et al. |
| 2021/0274527 | A1 | 9/2021 | Nakamura et al. |
| 2021/0360632 | A1 | 11/2021 | Yang et al. |

OTHER PUBLICATIONS

T. Strohmer et al., "Grassmannian frames with applications to coding and communication", Applied and Computational Harmonic Analysis, vol. 14, Mar. 26, 2003, pp. 257-275.

Etsi, "Intelligent Transport Systems (ITS); Vehicular Communications; Basic Set of Applications; Part 2: Specification of Cooperative Awareness Basic Service", ETSI EN 302 637-2, V1.3.1, Sep. 2014, pp. 1-44.

3GPP, "3rd Generation Partnership Project; Technical Specification Group Radio Access Network; NR; Physical channels and modulation (Release 16)", 3GPP TS 38.211 V16.2.0, Jun. 2020.

3GPP, "3rd Generation Partnership Project; Technical Specification Group Radio Access Network; NR; Physical layer procedures for data (Release 16)", 3GPP TS 38.214 V16.2.0, Jun. 2020.

Mediatek Inc., "Summary of RAN1 Agreements for Rel-14 DL MUST", 3GPP TSG RAN WG1 Meeting #87 R1-1613802, Nov. 14-18, 2016, pp. 1-5.

ZTE, "Key processing modules at transmitter side for Noma", 3GPP TSG RAN WG1 Meeting #93 R1-1805840, May 21-May 25, 2018, pp. 1-11.

Qualcomm Incorporated, "Transmitter Side Signal Processing Schemes for NOMA", 3GPP TSG RAN WG1 Meeting #94 R1-1809434, Aug. 20-24, 2018, pp. 1-11.

A. Chorti, "Rate Analysis and Deep Neural Network Detectors for SEFDM FTN Systems", arXiv:2103.02306v1, Mar. 3, 2021, pp. 1-5.

H. Iimori, "Robust Symbol Detection in Large-Scale Overloaded NOMA Systems", IEEE Open Journal of the Communications Society, Mar. 9, 2021, pp. 512-533.

Huawei, Hisilicon, Revised WID: Physical Layer Enhancements for NR Ultra-Reliable and Low Latency Communication (URLLC), 3GPP TSG RAN Meeting #84 RP-191584xxxx, Jun. 3-6, 2019, pp. 1-5.

T. Xu et al., "Spectrally Efficient FDM: Spectrum Saving Technique for 5G?", 1st International Conference on 5G for Ubiquitous Connectivity, Feb. 12, 2015, pp. 1-6.

3Gpp, "3rd Generation Partnership Project; Technical Specification Group Radio Access Network; Study on Downlink Multiuser Superposition Transmission (MUST) for LTE (Release 13)", 3GPP TR 36.859 V13.0.0, Dec. 2015, pp. 1-48.

3GPP, "3rd Generation Partnership Project; Technical Specification Group Radio Access Network; Study on New Radio (NR) access technology (Release 16)", 3GPP TR 38.912 V16.0.0, Jul. 2020.

3GPP, "3rd Generation Partnership Project; Technical Specification Group Radio Access Network; Study on Non-Orthogonal Multiple Access (NOMA) for NR (Release 16)", 3GPP TR 38.812 V16.0.0, Dec. 2018, pp. 1-134.

Z. Kaleem et al., "System-Level Performance Evaluation of the SVD based Codebooks in 3GPP LTE HetNet", IEEE Xplore, Dec. 15, 2014, pp. 968-969.

B.G. Bodmann et al., "A Quantitative Notion of Redundancy for Finite Frames", arXiv:0910.5904v2, Nov. 19, 2009, pp. 1-19.

S.M.Alamouti, "A Simple Transmit Diversity Technique for Wireless Communications", IEEE Journal on Select Areas in Communications, vol. 16, No. 8, October 1008, pp. 1451-1458.

Razvan-Andrei Stoica, "Frame-theoretic Designs for Future Wireless Communications", Jacobs University, Department of Computer Science & Electrical Engineering, Sep. 3, 2019, pp. 1-226.

J.H. Conway, "Packing Lines, Planes, etc.: Packings in Grassmannian Spaces", Experimental Mathematics, vol. 5, No. 2, 1996, pp. 139-159.

* cited by examiner

DETERMINING A PRECODER FOR WIRELESS COMMUNICATIONS

CROSS-REFERENCE TO OTHER APPLICATIONS

This is a continuation application of and claims priority to U.S. patent application Ser. No. 17/508,228 entitled "DETERMINING A PRECODER FOR WIRELESS COMMUNICATIONS" and filed on Oct. 22, 2021, for Razvan-Andrei Stoica, which is incorporated herein by reference.

FIELD

The subject matter disclosed herein relates generally to wireless communications and more particularly relates to determining a precoder for wireless communications.

BACKGROUND

In certain wireless communication systems, a User Equipment device ("UE") is able to connect with a fifth-generation ("5G") core network (i.e., "5GC") in a Public Land Mobile Network ("PLMN") In wireless networks, increased process automation, proliferation of streaming services and advances in immersive digital experiences expose the wireless communications systems to heterogeneous and stringent traffic requirements in terms of reduced latency, higher spectral efficiency, and increased robustness. However, such requirements are often competing for physical communications resources to deliver on the necessary quality of service demands of various applications.

BRIEF SUMMARY

Disclosed are procedures for determining a precoder for wireless communications. Said procedures may be implemented by apparatus, systems, methods, and/or computer program products.

In one embodiment, a transmitter node apparatus includes a processor that determines a precoder for a set of modulation symbols, the determined precoder comprising a plurality of codewords and configured to reduce an ensemble interference and a pairwise interference among the plurality of codewords. In one embodiment, the processor precodes the set of modulation symbols based on the determined precoder. In one embodiment, the processor maps the precoded set of modulation symbols to a set of physical transmission resources, wherein a number of modulation symbols in the set of modulation symbols is greater than a number of physical transmission resources in the set of physical transmission resources. In one embodiment, the apparatus includes a transceiver that transmits, to a receiver node, an indication of the determined precoder and the set of physical transmission resources.

In one embodiment, a method of a transmitter node includes determining a precoder for a set of modulation symbols, the determined precoder comprising a plurality of codewords and configured to reduce an ensemble interference and a pairwise interference among the plurality of codewords. In one embodiment, the method includes precoding the set of modulation symbols based on the determined precoder. In one embodiment, the method includes mapping the precoded set of modulation symbols to a set of physical transmission resources, wherein a number of modulation symbols in the set of modulation symbols is greater than a number of physical transmission resources in the set of physical transmission resources. In one embodiment, the method includes transmitting, to a receiver node, an indication of the determined precoder and the set of physical transmission resources.

In one embodiment, a receiver node apparatus includes a transceiver that receives an indication of a determined precoder from a transmitter node and receives a set of physical transmission resources, the physical transmission resources mapped to a set of modulation symbols that are precoded using the determined precoder. In one embodiment, the apparatus includes a processor that uses the determined precoder and the set of physical transmission resources for transmissions between the receiver node and the transmitter node.

In one embodiment, a method of a receiver node includes receiving an indication of a determined precoder from a transmitter node. In one embodiment, the method includes receiving a set of physical transmission resources, the physical transmission resources mapped to a set of modulation symbols that are precoded using the determined precoder. In one embodiment, the method includes using the determined precoder and the set of physical transmission resources for transmissions between the receiver node and the transmitter node.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
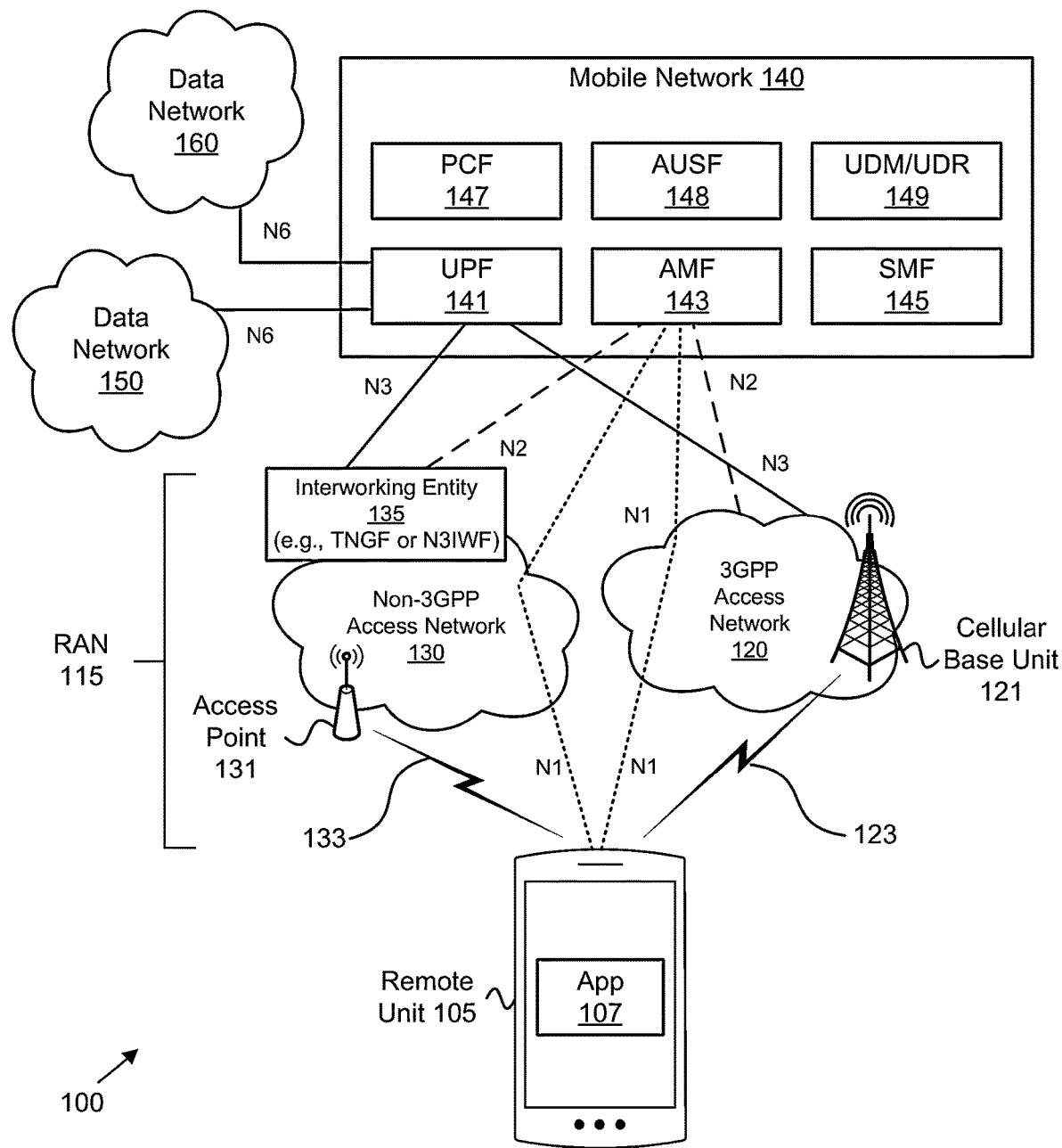
FIG. 1 is a schematic block diagram illustrating one embodiment of a wireless communication system for determining a precoder for wireless communications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for determining a precoder for wireless communications. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Increased process automation, proliferation of streaming services, and advances in immersive digital experiences expose the wireless communications systems to heterogeneous and stringent traffic requirements in terms of reduced latency, higher spectral efficiency, and increased robustness. However, such requirements are often competing for physical communications resources to deliver on the necessary quality of service demands of various applications.

To this end, heterogeneous traffic streams originating from the same point of transmission become more and more apparent in modern communications systems. For instance, high-rate and low-to-medium latency data streams associated with multi-object audio/video content or immersive 360 degrees/3D content are paired with control and metadata low-rate reduced latency streams within eXtended Reality ("XR") applications. The latter are necessary for the receiver side to offer a high quality of experience to users irrespective of the wireless channel conditions. Similarly, in autonomous operation control and consensus loops combinations of low-latency, highly-reliable control streams are paired with high data rate streams of sensor inputs (e.g., point cloud data, 360° video, etc.) of a node. Alternatively, cognitive radio systems may exhibit traffic of high heterogeneity where high data rate/massive machine type of communications streams are paired with low latency traffic for control and metadata signaling among radio nodes and relays.

Therefore, serving a greater stream-level heterogeneity and stricter timing requirements with increased determinism on the radio link is a challenge. Furthermore, it is often the case that the data streams arrive already source encoded at the radio transmitter such that the potential advantage of further inter-stream correlations cannot be taken in practical systems realizations.

Consequently, it is of high interest to consider methods and mechanisms to effectively multiplex multi-stream information for point-to-point ("P2P") wireless transmissions (e.g., from a base station, e.g., a Node B ("NB"), a 5G Node B ("gNB"), an evolved Node B ("eNB"), and/or the like, to a UE/customer premises equipment ("CPE"), UE to UE etc.) across heterogeneous traffic requirements and provide spectral efficient tools for higher layer procedures to deliver consistent quality of service to various applications.

In one embodiment, the subject matter herein proposes an effective generic precoding method for a transmitter terminal applicable to generic P2P links, which is jointly optimized for single-stream overloading or multi-stream non-orthogonal combining and for interference management, respectively. The proposed method unlocks additional degrees of freedom for multiplexing beyond Nyquist rate for heterogeneous requirements of rate, latency, and reliability.

The proposed solution, in one embodiment, also describes—an efficient realization of the above method via complex-valued linear transformations as harmonic spherical codes or as a generic realization via linear spike spherical codes and associated various signaling procedures necessary to communicate precoding configurations between a transmitter node/terminal and a receiver node/terminal for different scenario realizations.

In one embodiment, the proposed solution in this disclosure targets flexible spherical codebooks in their overloaded (compressive) representations for heterogeneous communications requirements. In one embodiment, a spherical codebook design for joint synchronous P2Plink-level overloading and self-interference management is disclosed where information symbols are represented by superposed complex-valued codewords on a unit hypersphere exploiting all available orthogonal physical degrees of freedom available as harmonic linear transforms based on truncated, power and interference optimized Discrete Fourier Transform ("DFT") matrices given the available signal space dimensionality and a desired overloading rate and/or approximate spherical linear codes yielded by optimized linear transforms with respect to the power spreading potential of the codewords and overloading interference.

In one embodiment, a spherical codebook is precoded for multiplexing of information symbols beyond the orthogonal capacity of the single communication link. The proposed method transforms the single P2Pcommunication link into a multiple access channel for single/multiple data streams of information sourced at the same device. The method expands the available signal space with virtual degrees of freedom at the cost of managed minimized interference, increasing link spectral efficiency as a sum-rate and exploiting existent orthogonal multi-user access schemes.

In one embodiment, the additional degrees of freedom and achievable capacity region gained may benefit single data stream transmissions (e.g., the proposed precoding by the spherical codebook in overloaded configuration for a single data stream acts as a faster-than-Nyquist ("FTN") signaling mechanism) at higher rates closer to the Shannon capacity than conventional orthogonal discrete coded realizations and synchronous non-orthogonal multiplexing at one transmitter for multiple data streams whose rates are split to benefit heterogeneous constraints of minimal rate, maximum latency, and minimal reliability of individual streams, applicable to combinations such as enhanced mobile broadband ("eMBB") and ultra-reliable low-latency communications ("URLLC") data streams, massive machine-type communications ("mMTC") and URLLC data streams, and eMBB and mMTC data streams.

In one embodiment, an associated signaling apparatus of the precoder and single/multiple stream multiplexing configurations is disclosed to aid receivers as part of data channel demodulation reference signal ("DM-RS") or as part of generic control information signal ("xCI") over control channels.

FIG. 1 depicts a wireless communication system 100 for determining a precoder for wireless communications, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NextGen RAN ("NG-RAN"), implementing New Radio ("NR") Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or packet data network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of non-access stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 147 is responsible for unified policy framework, providing policy rules to control plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NSSAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), PDN Gateway ("P-GW"), Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, general realizations of radio transmission multiplexing of information streams can be widely categorized as:

interference free—information symbols pertaining to potentially different data streams are separated over orthogonal degrees of freedom over the signaling domain to avoid self-interference effects;

interference-managed—information symbols pertaining to potentially different data streams are separated over non-orthogonal degrees of freedom in a consciously designed manner to minimize or control the self-inflicted signaling interference and aid symbol detection at the receiver.

In one embodiment, conventional approaches to practical systems exploit the interference-free concept, e.g., as described in 3GPP TS 38.211 and TS 38.214, even though in information-theoretic sense, e.g., see El Gamal, A., & Kim, Y. H. (2011), Network information theory. Cambridge University Press, it is known that superposition signaling is beneficial in offering higher spectral efficiency and signaling design degrees of freedom in case of heterogeneous transmission scenarios.

Regarding 3GPP signaling and multiplexing, in one embodiment, the 3GPP systems leverage the orthogonal frequency-domain multiplexing ("OFDM") physical transport waveform in multiplexing orthogonally symbols across both time and frequency domains in a quest for an interference-free multiplex (e.g., TS 38.211). To this end, a physical layer cyclic prefix buffer may be prepended to time domain OFDM symbols (e.g., Tinfo=1/sub-carrier-spacing duration) to counteract multipath effects and collect the interference inflicted by the propagation media. However, these portions of signals cannot be further leveraged in transmitting additional information, as their main role is in fact to ensure no inter-symbol interference ("ISI") over multiple time-domain multiplexing ("TDM") OFDM transmissions.

In orthogonal methods, the NR Physical Layer ("PHY") in 3GPP has been proposed to offer signaling flexibility at fundamental levels to cater jointly for eMBB, URLLC and mMTC types of traffic that NR aimed to address. Features addressing this type of flexibility include:
- scalable OFDM numerology affecting frequency-domain subcarrier spacing ("SCS") and time-domain OFDM symbol duration to aid heterogeneous traffic resource allocation in time and frequency domain (e.g., (4.1-4.3, TS 38.211), (8.1, TR 38.912));
- mini-slots introducing 2-,4-symbol long time allocation for UL/DL primarily targeting lower-latency enhancements (e.g., 8.1, TR 38.912);
- bandwidth parts adding additional scalability enhancements to the frequency-domain by allowing multiple BW components to be served in an interference free manner across various range of devices (e.g., 4.5, TS 38.211).

Nevertheless, in one embodiment, these enhancements are inherently limited by basic propagation principles and resource availability, as follows:
- scalable OFDM numerology suffers generally from the uncertainty principle (as signals cannot be jointly well localized in time and frequency), as well as from the bandwidth ("BW") scarcity in frequency range 1 (410 MHz-7125 MHz) ("FR1") licensed bands; mini-slots absolute resolution is tightly linked to the SCS width, hence particular configurations may be infeasible in practice;
- bandwidth parts ("BWP") are constrained again by spectrum availability as well as UE capabilities to support various BWP configurations.

For non-orthogonal methods, in one embodiment, to solve such physical and resources constraints, 3GPP has also previously considered transmission strategies based on the interference-managed approach to provide PHY tools to support heterogeneous traffic in eMBB, URLLC or mMTC directions. The following points are relevant:
- DL Multiuser Superposition Transmission ("DL-MUST") studied in TR 36.859 and integrated in Release 14 of 3GPP given reduced complexity configurations as detailed in clause 2 of R1-1613802;
- Non-orthogonal Multiple Access ("NOMA") schemes and advanced receivers studied in SI TR 38.812 to improve the multiple access techniques of NR and system spectral efficiency could be considered for next releases.

Despite significant performance gains reported in several contributions to TR 38.812 for link-level simulation ("LLS")/system-1 evel simulation ("SLS") with non-sparse NOMA codebooks and spreading sequences, such as for instance RSMA (e.g., R1-1809434/Cao, Y., Sun, H., Soriaga, J., & Ji, T. (September 2017). Resource spread multiple access-A novel transmission scheme for 5G uplink. In 2017 IEEE 86th Vehicular Technology Conference (VTC-Fall)) or MUSA (e.g., R1-1805840), the schemes required may include:
- additional distributed synchronization mechanisms among UEs by configured grants and codeword orchestration;
- significant DM-RS and Random Access Channel ("RACH") enhancements;
- receivers capable of resolving interference.

NOTE: The latter advanced receivers, in one embodiment, were shown to not be a bottleneck given reasonable complexity designs and complementary trade-offs between interference cancellation ("IC") and complexity for linear receivers, i.e., linear minimum mean squared error ("LMMSE"), with both hard-IC and hybrid-IC for block- and non-block-based receiver processing (e.g., TR 38.812).

Regarding cross-layered and configuration methods, in one embodiment, to offer support to URLLC requirements under heterogeneous traffic 3GPP introduced features within NR to this regard both at PHY and at higher-level signaling and protocol stacks, e.g., RP-191584, such as:
- Physical Downlink Control Channel ("PDCCH") enhancements:
  - configurable field sizes for Downlink Control Information ("DCI") improved reliability;
  - increased PDCCH monitoring configuration to minimize scheduling delay.
- Uplink Control Information ("UCI") enhancements:
  - support for multiple Hybrid Automated Repeat-Request Acknowledgement ("HARQ-ACK") feedback report per slot to reduce latency;
  - construction of multiple HARQ-ACK codebooks for heterogeneous services.
- Physical Uplink Shared Channel ("PUSCH") enhancements:
  - support for cross-slot-boundary scheduling;
  - scheduling enhancement thereafter of PUSCH dynamic grant;
  - scheduling enhancement thereafter of PUSCH configured grant.
- HARQ prioritization and scheduling enhancements in support of low-latency traffic over non-priority traffic;
- inter-UE prioritization and multiplexing by:
  - UL pre-emption allowing gNB to interrupt UL of a user to accommodate URLLC for another user;
  - enhanced UL power control to enable power increase of UL URLLC overlapping with eMBB traffic.
- multiple active configurations for configured grants to accommodate heterogeneous traffic requirements.

The foregoing enhancements add upon existing features, e.g., Release 15 URLLC features, such as:
- high SCS for lower signaling latency over radio interface;
- mini-slots configurations; configured-grant procedures enabling UEs to autonomously UL without grant requests to gNB;
- DL pre-emption by UL URLLC traffic;
- Packet Data Convergence Protocol ("PDCP") duplication and multi-slot repetition;
- low-spectral efficient Modulation and Coding Scheme ("MCS") configurations.

In one embodiment, despite all these features, there are still some radio access technology gaps in offering support to heterogeneous traffic over wireless communications. For instance, multiple UEs and advanced terminals are capable already to produce mixed streams of data that needs to be transmitted with heterogeneous requirements over a network, such as:

- autonomous vehicles may emit in Vehicle-to-Everything Communications ("V2X") both high-rate video streams as well as cooperative awareness messages as per ETSI C-ITS specifications in support of dead-angle awareness and traffic safety (e.g., ETSI European Standard EN 302637-2 (v1.4.1—April 2019). Intelligent Transportation Systems (ITS); Vehicular Communications; Basic Set of Applications; Part 2: Specification of Cooperative Awareness Basic Service);
- XR terminals or UE-tethered XR terminals may need to process both eMBB video encoded traffic as well as URLLC control information for high-quality remote renderings of XR content;
- other examples include a terminal that generates and transmits simultaneously heterogeneous traffic including remote tele-operations, advanced sensors in digital twinning, holographic teleportation, etc.

In one embodiment, some open questions that remain to be addressed include:

- how can the transmission of information be optimized to benefit simultaneously heterogeneous multiple streams originating at the same transmission point under constrained physical multiplexing resources (time/frequency/layers)?
- how to code simultaneous transmissions of multiple uncorrelated streams in a spectral efficient way?

In one existing method, spectrally efficient frequency division multiplexing ("SEFDM"), which, in contrast to the 3GPP NOMA solutions discussed priorly, which treat multiple access schemes for information at multiuser level, SEFDM studies a fundamental spectrum efficient non-orthogonal waveform capable to provide the additional degrees of freedom and virtual scheduling resources necessary to accommodate heterogeneous requirements at individual information stream level (e.g., Xu, T., & Darwazeh, I. (November 2014). Spectrally efficient FDM: Spectrum saving technique for 5G? In 1st International Conference on 5G for Ubiquitous Connectivity (pp. 273-278). IEEE.). SEFDM was also considered as a FTN waveform candidate to NR (e.g., Ahmadi, S. (2019). 5G NR: Architecture, technology, implementation, and operation of 3GPP new radio standards. Academic Press.; Xu, T., & Darwazeh, I. (November 2014). Spectrally efficient FDM: Spectrum saving technique for 5G? In 1st International Conference on 5G for Ubiquitous Connectivity (pp. 273-278). IEEE.).

Concretely, SEFDM compresses the OFDM modulation allowing for spectrum saving under the same number of data information subcarriers, or alternatively, for superimposing more data subcarriers than OFDM within the same BW constraints. This is achieved by an interference-managed linear transform on the information symbols $s_n$ as $$X[k] = \frac{1}{\sqrt{\rho N}} \sum_{n=0}^{N-1} \exp\left(\frac{j2\pi nk \cdot \alpha}{\rho N}\right) \cdot s_n. \quad \text{Eq. 1}$$

Thus, the regular OFDM modulation is scaled by the BW compression factor $\alpha = \Delta f_{SEFDM} \cdot T_S$, and by the oversampling integer factor $\rho \geq 1$, respectively. And for $\alpha = 1$ and $\rho = 1$, the SEFDM modulation is identical to the regular OFDM Inverse Fast Fourier Transform ("IFFT")based modulator.

The SEFDM time-signal $X[k]$ where $k=\{0, 1, \ldots, \rho N-1\}$ may be oversampled or not depending on the system realization.

The interference introduced by the SEFDM modulation technique can be easily computed by grouping the modulator sub-bands and considering their Gram matrix representing the induced inter-carrier interference ("ICI") when $\alpha < 1$. This yields the matrix $C \in \mathbb{C}^{N \times N}$ $$C_{m,n}(\alpha, \rho) = \frac{1}{\rho N} \cdot \begin{cases} \rho N, & m = n \\ \frac{1 - \exp(j2\pi(n-m)\alpha)}{1 - \exp\left(\frac{j2\pi(n-m)\alpha}{\rho N}\right)}, & m \neq n \end{cases} \quad \text{Eq. 2}$$

The knowledge of the self-interference levels of C can be leveraged at the receiver post-demodulation which is performed by matched filtering with conjugate operation described in Eq. 1 (e.g., Xu, T., & Darwazeh, I. (November 2014). Spectrally efficient FDM: Spectrum saving technique for 5G? In 1st International Conference on 5G for Ubiquitous Connectivity (pp. 273-278). IEEE.). Turbo and hybrid-IC receivers (e.g., Xu, T., & Darwazeh, I. (November 2014). Spectrally efficient FDM: Spectrum saving technique for 5G? In 1st International Conference on 5G for Ubiquitous Connectivity (pp. 273-278). IEEE.) and advanced discrete-aware linear receivers with knowledge of C (e.g., Iimori, H., De Abreu, G. T. F., Hara, T., Ishibashi, K., Stoica, R. A., Gonzalez, D., & Gonsa, O. (March 2021). Robust symbol detection in large-scale overloaded NOMA systems. IEEE Open Journal of the Communications Society, 2, 512-533) are proven to detect the information symbols close to orthogonal signaling performance in realistic scenarios with at most cubic complexity for overloading levels of up to 40% (e.g., Xu, T., & Darwazeh, I. (November 2014). Spectrally efficient FDM: Spectrum saving technique for 5G? In 1st International Conference on 5G for Ubiquitous Connectivity (pp. 273-278). IEEE.; Iimori, H., De Abreu, G. T. F., Hara, T., Ishibashi, K., Stoica, R. A., Gonzalez, D., & Gonsa, O. (March 2021). Robust symbol detection in large-scale overloaded NOMA systems. IEEE Open Journal of the Communications Society, 2, 512-533.), i.e., $\alpha=0.6$. Similar remarks apply to early neural receivers at lower complexity (e.g., Chorti, A., & Picard, D. (2021). Rate Analysis and Deep Neural Network Detectors for SEFDM FTN Systems. arXiv preprint arXiv:2103.02306.).

The SEFDM modulation/demodulation efficient hardware realization can be linked to the IFFT/FFT transform as follows. The saving in BW offered by SEFDM given a total BW constraint allows an additional number of data subcarriers to be used for transmission. Assume thus the total number of SEFDM subcarriers to be M such that the original BW of an N-dimensional OFDM modulation is $\Delta f_{OFDM} N = \Delta f_{SEFDM} M$. It follows that $\alpha = \rho N/M$, or equivalently, $M = \rho N/\alpha$, with M, N, $\rho$ integers and furthermore M may be a power of 2 for efficient IFFT/FFT realizations. This fact limits $\alpha$ to a particular set of values for scalable hardware implementations taking advance of the radix-2 FFT.

In general, the present disclosure introduces a scalable transformation-based precoder. In one embodiment, this has the effective role of compressing multiple information symbols in a spectrally efficient manner over the available physical communications resources. The features of the proposed design offer novel degrees of freedom for transmission encoding applicable to increasingly emerging heterogeneous communications requirements of information data streams originating from a single transmission point (e.g., network node, gNB, Transmission-Reception Point ("TRP"), UE).

Information Theory defines the fundamental limit of capacity for a wireless communication link determining its spectral efficiency upper bound as a function of the instantaneous Signal-to-Noise Ratio ("SNR") over the channel. Attaining this limit given the inherent discrete processing and MCS of modern communications systems is practically infeasible. In addition, the increasing heterogeneous requirements of data in terms of high rate, low-latency, high reliability across more streams of information makes this maximization problem difficult in practice. This is the case, as competing requirements deplete the orthogonal resources for communications which are currently exploited, such as for instance, frequency subbands, spatial degrees of freedom, time slots.

A flexible solution to increase the spectral efficiency of the current communications systems under fixed physical resources (i.e., spectrum, spatial and time degrees of freedom) is needed to effectively address this emerging issue and allow competing non-orthogonal requirements to be multiplexed over a single use of the channel. Information-theoretic results (e.g., El Gamal, A., & Kim, Y. H. (2011). Network information theory. Cambridge University Press.) also suggest a generic strategy to treat the problem by means of joint interference management and superposition to funnel more information simultaneously over a communication link.

Figure 2:
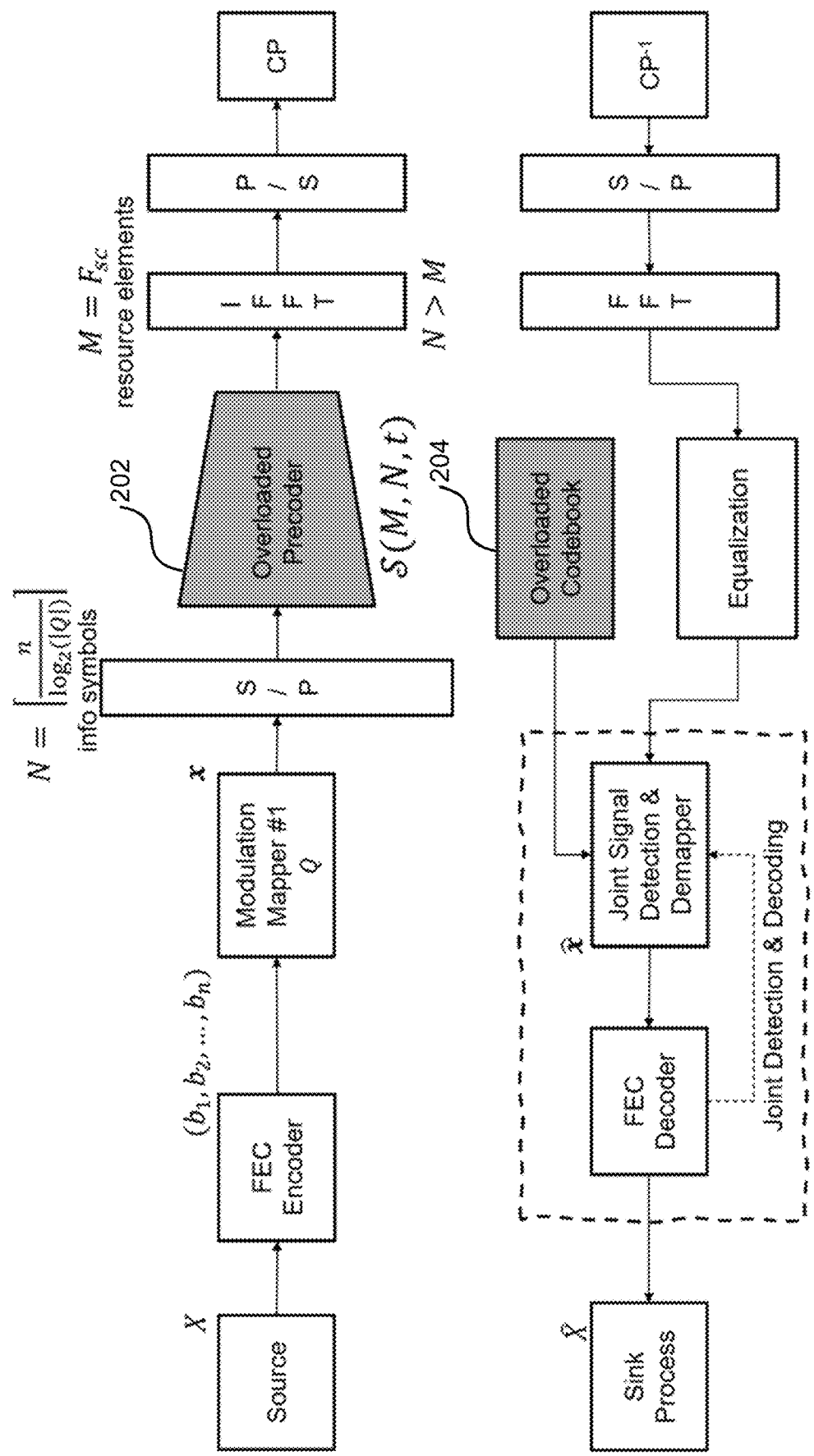
FIG. 2 is a diagram illustrating one embodiment of a communications system based on OFDM modulation with transmitter on top and receiver at the bottom.

Consider, without loss of generality, the communications system of FIG. 2, which depicts a communications system based on OFDM modulation with a transmitter on top and a receiver at the bottom. In gray, the proposed transformation block precoder 202 is highlighted on the transmitter side, whereas the receiver's necessary knowledge of the codebook 204 is outlined. The proposed transformation pre-mapping of the information symbols to the orthogonal communication resources, e.g., OFDM modulation, is represented at the transmitter as a precoder 202. The codebook design of the precoder shall act as an information funnel to speed up the signaling over the waveform multiplexing. This is achieved, in one embodiment, by compression with an optimized codebook 204 whose interference is appropriately managed to reduce all the self-interference effects. Let such a codebook be denoted by S(M, N, t) such that:

M is the dimensionality of the codewords;

N is the dimensionality of the codebook;

t represents the maximum cross-codeword interference (or, alternatively, cross-correlation) magnitude.

In one example, M is the number of subcarriers/resource elements ("REs") occupied. Generally, M can be number of modulation resource that is being multiplexed. For example, the modulation resource may be frequency subcarriers, time slots, spatial layers or antenna ports, or a combination thereof.

In one example, N is the maximum number of information symbols that is precoded.

Furthermore, consider the codeword dimensionality M constrained to the actual available physical resources available for communication. As such, the question to answer is: "how to optimize the N-sized codebook design to simultaneously benefit more information symbols than the multiplexing degree of freedom available?"

In one embodiment, the proposed design for the codebook is applicable to finite-energy discrete complex-valued inputs and encodes higher dimensional points onto non-orthogonal combinations of lower dimensional complex-valued codewords. The inherent non-orthogonality is a consequence of the dimensionality reduction in the inputs' representation as lower dimensional codewords which compresses the information symbols at the price of induced interference. To optimize the transmission strategy and the link spectral efficiency, the induced interference can be reduced as part of the codebook design. As a result, the proposed design of the precoding method described can be reduced to the optimization problem:

$$t^2 = \min_S \max_{k \neq l} |i(s_k, s_l)|^2 \qquad \text{Eq. 3}$$

$$\text{s.t. } k \neq l \in \{1, 2, \ldots, N\}$$

$$SS^* = \frac{N}{M} Id_M$$

$$|i(s_j, s_j)|^2 = 1, \forall j$$

The codebook design may be further broken down as follows: the objective of the optimization is to minimize the maximum interference energy measure, e.g., $|i(s_k, s_l)|^2$, across any pair of different codewords from S(M, N, t). The second constraint of the codebook, $$SS^* = \frac{N}{M} Id_M,$$

imposes the uniform and uncorrelated ergodic power representation of any random input combinations onto the lower-dimensional physical resource space. The third constraint limits the codewords of the codebook to uniform unit energy.

Considering the practical linear transform realization of the codebook design, the optimization from Eq. 3 above can be simplified to its linear inner product space formulation as finding the linear code S=S(M, N, t), such that:

$$t^2 = \min_S \max_{k \neq l} |\langle s_k, s_l \rangle|^2 \qquad \text{Eq. 4}$$

$$\text{s.t. } k \neq l \in \{1, 2, \ldots, N\}$$

$$SS^* = \frac{N}{M} I_M$$

$$\|s_j\|^2 = 1, \forall j$$

$$S \in \mathbb{C}^{M \times N}, M < N.$$

The cross-codewords interference energy measure of Eq. 3, $|i(s_k, s_l)|$ has been replaced in Eq. 4 by the $L_2$ inner-product measure, $|\langle s_k, s_l \rangle|$, and the adjoint operator * has been replaced by the conjugate transposition of linear vector spaces, respectively. Similarly, the identity operator $Id_M$ has been replaced by its subsequent linear counterpart, e.g., the identity matrix $I_M$, whereas the codebook can be compactly described by the complex matrix S.

The design optimization problem of Eq. 4 may attain its global minimum for Grassmannian code constructions (e.g., Casazza, P. G., & Kutyniok, G. (Eds.). (2012). Finite frames: Theory and applications. Springer Science & Business Media.), which is the well-known Welch Bound ("WB") for the maximum cross-codeword interference, such that:

$$t \geq \sqrt{\frac{N-M}{M(N-1)}}.\qquad\text{Eq. 5}$$

The existence of such optimal Grassmannian codes, $$S\left(M, N, \sqrt{\frac{N-M}{M(N-1)}}\right),$$

is not universally applicable to any generic dimensionality pair (M, N), (e.g., Strohmer, T., & Heath Jr, R. W. (2003). Grassmannian frames with applications to coding and communication. Applied and computational harmonic analysis, 14(3), 257-275.), as per the conjecture of Grassmannian frames existence in Representation Theory. On the other hand, the design condition imposed by the diagonalization of the operator $SS^H$ in the second constraint relates to bringing the codebook S as close as possible as an ensemble to an orthogonal basis in terms of power spreading and representation optimality. This also impacts the ensemble total interference energy as follows:

$$\|S^H S\|_F^2 = \qquad\text{Eq. 6}$$
$$\text{trace}(S^H S \cdot S^H S) = \text{trace}(SS^H \cdot SS^H) = \text{trace}\left(\frac{N}{M}I_M \cdot \frac{N}{M}I_M\right) = \frac{N^2}{M},$$

where the symmetric Gramian operator $S^H S$ is just a compact representation of all the possible cross-codewords interference levels, as its entries are just all $|\langle s_k, s_l\rangle|$, k, l ∈ {1, 2, . . . , N}. Eq. 6 additionally highlights that the proposed precoder design is constrained to a total sum of squared correlations among its codewords equal to $$\frac{N^2}{M},$$

and as such itself is a complex valued WB Equality ("WBE") sequence. On the other hand, the precoder design jointly seeks for a codebook such that not only this ensemble sum interference level is optimal, but also any pairwise codeword interference level is individually minimized as much as possible as well. In effect this jointly lowers the induced interference by overloading.

Figure 3:
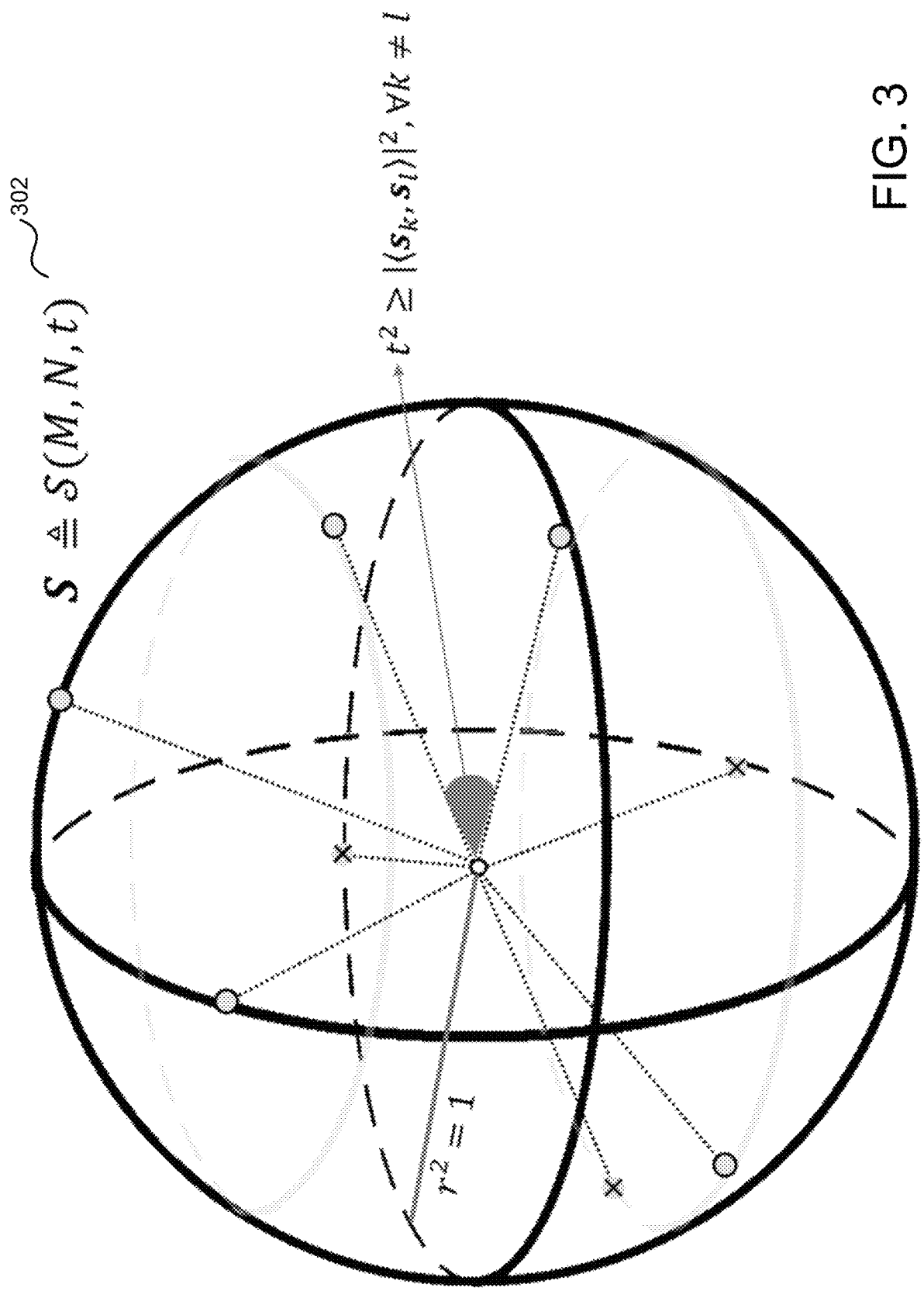
FIG. 3 is a diagram illustrating one embodiment of a depiction of a spherical codebook construction.

The unit-norm equality constraint on the individual codewords enforces a well-defined energy normalization relevant to practical systems, but simultaneously defines the search space of the codewords to a unit hypersphere of dimensionality M. As a result, the outcome of the proposed precoder S(M, N, t) 302 is a spherical codebook, as displayed in FIG. 3. The spherical precoder S thus selects a finite set of N points on an M-dimensional unit hypersphere such that the cross-correlation of these N codewords is pairwise and ensemble-wise controlled and minimized.

The application of the proposed precoder S(M, N, t) 302 to increase spectral efficiency and to provide additional degrees of freedom for the existent physical resources of the signal space is valid both for single data streams, as well as, for multiple independent data streams with heterogeneous rate/latency/robustness requirements as detailed in the following embodiments.

In some embodiments, the precoding process is defined as a general non-linear function, covering non-linear precoding. The design can be done by parameterized training (e.g., like a deep neural network ("DNN"), within a function space constructed via a known reproducing kernel Hilbert space ("RKHS")), where other objective/constraint items can be added to Eq. 3. Some embodiments may so consider a constraint on a measure of receiver decoding complexity, or a constraint on keeping a precoder-agnostic receiver processing scheme (e.g., the receiver works with a fixed precoder assumption, but the transmitter precoders are tunned based on the required quality of service or objective function).

The receiver-side detection and decoding of communications symbols precoded by S(M, N, t) 302 generally resumes to resolving the introduced interference. To this end, in one embodiment, a receiver digital signal processor requires knowledge of the codebook or codebook interference pattern. Post-precoding, the compressed symbol to transmit is a linear combination of the codewords scaled by complex discrete input points of the overloaded information symbols.

As a result, in one embodiment, the compressed precoded symbol is an M-dimensional overloaded discrete signal which can be jointly unmapped to the discrete input symbols by decoding the codebook interference. The detection of the original information symbols can be effectively achieved therefore by approximate joint maximum likelihood detection (e.g., Iimori, H., De Abreu, G. T. F., Hara, T., Ishibashi, K., Stoica, R. A., Gonzalez, D., & Gonsa, O. (March 2021). Robust symbol detection in large-scale overloaded NOMA systems. IEEE Open Journal of the Communications Society, 2, 512-533.), by linear iterative MMSE-IC with soft or hard decisions (e.g., Xu, T., & Darwazeh, I. (November 2014). Spectrally efficient FDM: Spectrum saving technique for 5G? In 1st International Conference on 5G for Ubiquitous Connectivity (pp. 273-278). IEEE.), by loopy belief propagation methods or by neural receivers (e.g., Chorti, A., & Picard, D. (2021). Rate Analysis and Deep Neural Network Detectors for SEFDM FTN Systems. arXiv preprint arXiv:2103.02306.) with knowledge of the interference pattern compactly represented by $S^H S$. For increased detection accuracy turbo receivers which employ joint detection and decoding given the MCS of the input symbols can also be applied to use the outer channel code redundancy to correct for the potential erroneous decisions of the symbol detector, either in soft outputs or hard outputs configuration.

In one embodiment, regarding overloading by harmonic spherical codes, to prevent signaling overhead required to transmit the full precoder information over a network, e.g., either the precoder codebook or its interference pattern, an embodiment of the proposed precoding method may consider codebook realizations where the transmitter and receiver share some knowledge of the family of the codebook. An implementation efficient embodiment may consider quantized complex realizations of the N codewords associated with the information symbols to encode signals based on harmonic multiples of the N-th root of unity given the twiddle factor $$\omega_N = \exp\left(-\frac{j2\pi}{N}\right).$$

An efficient ensemble representation of the full N-sized harmonic orthonormal representation basis is provided by the unitary DFT matrix realization summarized below as:

$$w_N^k = [\omega_N^{k \cdot 0} \ \omega_N^{k \cdot 1} \ \dots \ \omega_N^{k \cdot i} \ \dots \ \omega_N^{k \cdot (N-1)}]^T, 0 \le i < N \qquad \text{Eq. 7}$$

$$W_N = \frac{1}{\sqrt{N}} [w_N^0 \ w_N^1 \ \dots \ w_N^i \ \dots \ w_N^{N-1}]^T, 0 \le i < N.$$

The compression of the higher dimensional input space N to the available signal space of dimensionality M is achieved by critically pruning harmonics from the complete orthonormal basis $W_N$. As a result, N−M rows are removed from $W_N$ to compress the individual N codewords to the available M physical space dimension. The resultant complex matrix of size M×N is denoted as $W_{N\backslash M}$. For N<M this implies that $W_{N\backslash M}$ is a rectangular matrix, such that:

$$W_{N\backslash M} W_{N\backslash M}^H = I_M \qquad \text{Eq. 8}$$

as the orthogonality of the remaining rows shall be preserved.

On the other hand, the interference pattern introduced by the Gram matrix, is obtained for each (k, l) entry as:

$$W_{N\backslash M}^H W_{N\backslash M} = G_{N\backslash M}(k, l) = \frac{1}{N} \cdot \begin{cases} M, & k = l \\ 0 - \sum_{i \in R_{N\backslash M}} \omega_N^{*l \cdot i} \omega_N^{k \cdot i}, & k \ne l, \end{cases} \qquad \text{Eq. 9}$$

where the ordered set $R_{N\backslash M}$ of cardinality $|R_{N\backslash M}|=N-M$ contains the indices $0 \le i < N$ of the pruned rows from the original DFT matrix $W_N$. To satisfy the normalization constraints for the ensemble and individual codewords, given Eq. 8 and Eq. 9, the M×N matrix $W_{N\backslash M}$ must be scaled by the factor $$\sqrt{\frac{N}{M}},$$

and so, the codebook:

$$S = S\left(M, N, \max_{k \ne l}|G_{N\backslash M}(k, l)|\right) = \sqrt{\frac{N}{M}} \cdot W_{N\backslash M} \qquad \text{Eq. 10}$$

is obtained.

In one embodiment, the best selection of $R_{N\backslash M}$ for S based on Eq. 9 consists in finding the N−M rows that minimize the magnitude of any sum $\Sigma_{i \in R_{N\backslash M}} \omega^{*l \cdot i}_N \omega_N^{k \cdot i}$, $\forall k \ne l$. The search space size necessary to perform the optimal $R_{N\backslash M}$ is $$C_{N-M}^N = \binom{N}{N-M},$$

where N−rows must be picked from the available N given the optimization objective. This combinatorial search problem is parallelizable and may always be solved effectively offline and its outputs tabulated.

In another embodiment, offline optimized harmonic spherical codes S(M, N, t) for generic M, N can be tabulated based on the dimensionality, i.e., M, N, and on the set of selected or pruned rows, respectively. Efficient embodiments may tabulate either the full set of indices consisting of the selected rows of the original N-DFT matrix if M≤N−M, or alternatively, the full set of indices consisting of the pruned rows if M>N−M. Some realizations may additionally tabulate a N-bit bitmap with a bit of information, e.g., $b_{pruned}$, to indicate whether the rows set is pruned or not.

In one embodiment, algebraically motivated, possibly non-optimal selections of the rows for $W_{N\backslash M}$ may be performed given the selection of M p-consecutive rows out of the N possible ones to form a geometric progression in the interference plane, or alternatively, the pruning of N−M p-consecutive rows out of the N possible ones to form a geometric progression in the interference plane. An ordered set of Z p-consecutive indices is defined as follows $R_p^z = \{i_{offset}, i_{offset+p}, i_{offset+2p}, \dots, i_{offset+(Z-1)p}\}$. The obtained geometric progressions defining the cross-code word interferences become:

$$|G_{N\backslash M}(k, l)| = \frac{1}{M} \cdot |\omega_N^{(k-l) \cdot offset}| \cdot \left| \sum_{i \in R_p^Z} \frac{1 - \omega_N^{(k-l) \cdot p \cdot Z}}{1 - \omega_N^{(k-l) \cdot p}} \right| \qquad \text{Eq. 11}$$

$$= \frac{1}{M} \cdot \left| \sum_{i \in R_p^Z} \frac{1 - \omega_N^{(k-l) \cdot p \cdot Z}}{1 - \omega_N^{(k-l) \cdot p}} \right| \ \forall \ k \ne l$$

where Z can either be M or N−M, respectively.

In certain embodiments where the number of input symbols exceeds the number of physical resources by unity, i.e., N=M+1, the selection of the pruned row for the codebook may be arbitrary. This is an outcome of the resultant interference levels for any k≠l and fixed pruned row i, which becomes:

$$t^2 \ge |G_{N\backslash M}(k, l)| = \left|\omega_N^{*l \cdot i} \omega_N^{k \cdot i}\right| = \frac{1}{M} \qquad \text{Eq. 12}$$

Therefore, the obtained codebook $$S\left(M, M+1, \sqrt{\frac{1}{M}}\right)$$

is globally optimal in terms of Eq. 4 as the WB in this case is equal to t and the precoder is a complex-valued maximum WBE sequence.

One embodiment may consider higher-layer configurations (e.g., Radio Resource Control ("RRC")) of the precoder dimensionality and design based on at least one of the data stream or multiple data streams and their associated rates, latency, and reliability requirements. The higher-layer configuration and codebook setup signaling may thus consist of a bit field (e.g., one 1 bit-width field) for at least one of dynamic switch-on, dimensionality information, i.e., M, N and row selection/pruning information, as well as optional metadata on the constraints, if any, regarding latency, rate or reliability guarantees that the radio link is required to fulfill.

Some realizations may configure/indicate/provide/report dimensionality based on offset to the configured physical resources M, i.e., α=N−M, to minimize the reporting signaling size. The enablement flag and precoder dimensionality information, in one embodiment, is required at the receiver side to resolve the precoding introduced interference and perform successful detection and subsequent decoding of information. The precoder information at the transmitter, in one embodiment, shall be indicated/reported/provided to the receiver (or the transmitter shall configure/ indicate/provide/report to the receiver the precoder information) as part of a data channel embedded reference signal (e.g., based on DM-RS sequence over Physical Downlink Shared Channel ("PDSCH")/PUSCH/Physical Sidelink Shared Channel ("PSSCH") realizations; the DM-RS may not be precoded) or via a control channel signaling mechanism (e.g., based on DCI for DL/UL scheduling over PDCCH, configured grant scheduling information, UCI for UL over Physical Uplink Control Channel ("PUCCH")/PUSCH—e.g., data-associated control UCI resources or OFDM symbols comprising the UCI on PUSCH may not be precoded with the overloading precoder, or SCI for Sidelink ("SL") over Physical Sidelink Control Channel ("PSCCH")).

In another embodiment, an effective signaling may be considered where additional compression mechanisms for the DFT rows information may be applied. Source coding compression such as algebraic or arithmetic lossless coding of the selected or pruned rows' indices may be used to reduce the necessary signaling overhead. The compression may be reported front-loaded to the actual compressed bitstream as an explicit bit field, followed by the selected source coding compression strategy to allow the retrieval of the compressed information. The compressed information may be indicated/reported/provided to the receiver as part of the precoder information.

A MIMO multi-layered embodiment may individually precode each layer by the proposed codebook. The precoding configuration may be Common-layer/layer-common precoding or layer-independent precoding. Common-layer/layer-common precoding may be performed with the same precoder on each layer, and a common precoder information/configuration may be reported/indicated/provided. Layer-independent precoding may be performed with different precoders for each layer with the precoder information may be reported/indicated/provided on a per-layer basis.

In some embodiments, the initial coding space with dimension M includes elements of subcarriers, elements of time domain symbols, elements of spatial layers, or a combination thereof.

In some embodiments, where a strong prior channel knowledge is present (e.g., a static Line-of-Sight ("LoS") condition), the interference objective function can be defined at the transmitter from the point of view of the receiver, e.g., the precoding strategy is designed such that it minimizes the interference among the precoded sequences after the effect of the channel.

Regarding overloading by general spike spherical codes, in one embodiment, alternate realizations may consider a codebook design which is unconstrained, e.g., no structural implicit assumptions are made, such as for instance, a harmonically quantized representation. In this case the codebook design shall take full advantage of the entire M-dimensional entropy of the spherical topology and exploit it to freely arrange the displacement of the N codewords.

Despite Eq. 4, being a highly non-trivial optimization problem, in one embodiment, it is solvable in approximate sense by stochastic numerical, algebraic alternate projections or algebraic shrinkage methods that take advantage of the spectral structure of the Gram matrix associated with S. The approximate solutions yield matrices S which satisfy the second constraint in terms of representation energy tightness across the physical resource space, e.g., $$SS^H = \frac{N}{M} I_M,$$

yet they are only approximate in terms of achieving the WB and maintaining unitary power of the associated codewords, i.e., $1-\delta \leq \|s_k\|^2 \leq 1+\delta$, $0 < \delta \ll 1$. This fact is a consequence of the polar decomposition in Representation Theory which states that for any arbitrary M×N matrix W an S WBE overloaded representation can be obtained as:

$$S = \sqrt{\frac{N}{M}} \cdot (WW^H)^{-0.5} W, \; \forall \, W \in \mathbb{C}^{M \times N}. \qquad \text{Eq. 13}$$

Figure 4:
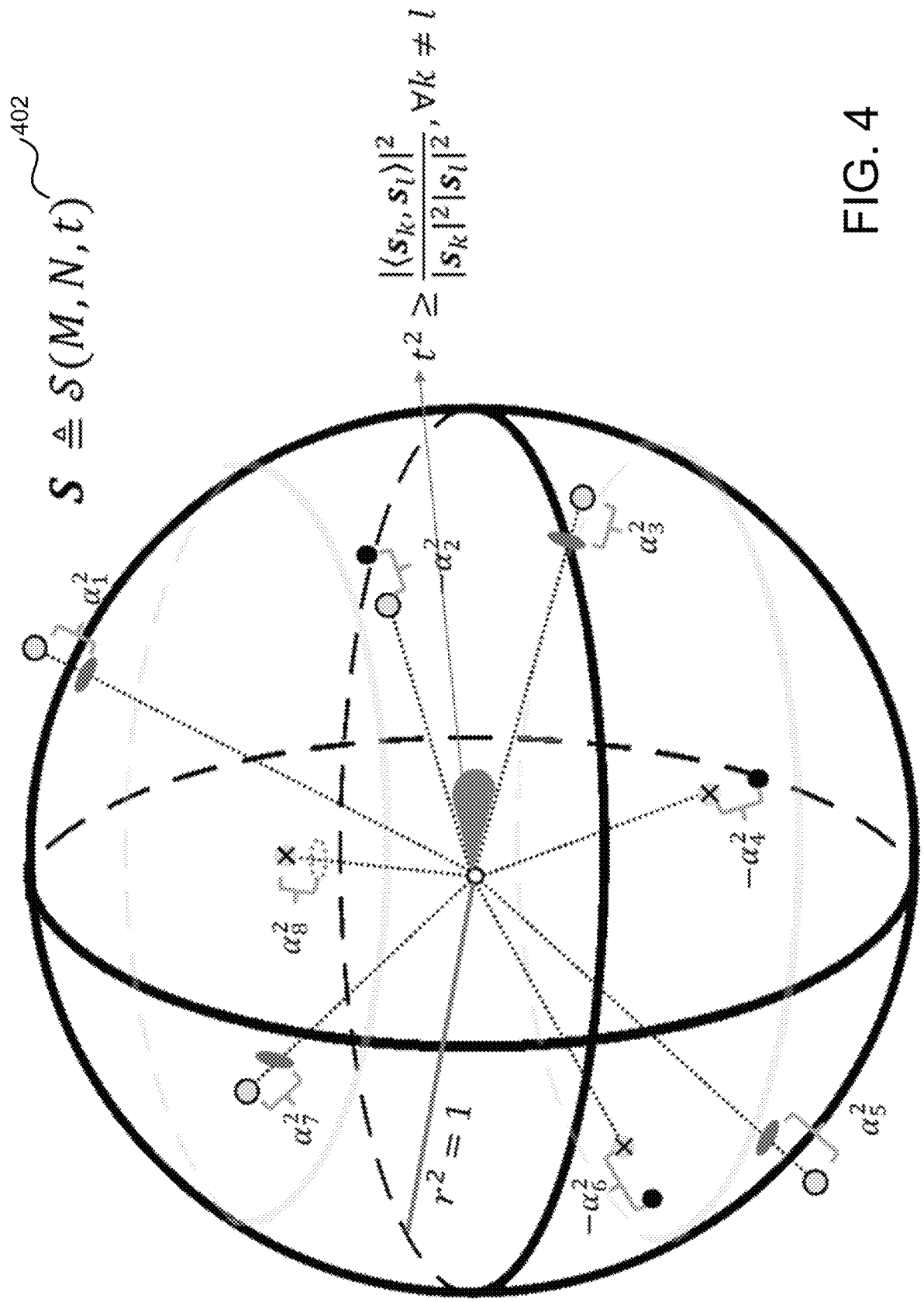
FIG. 4 is a diagram illustrating one embodiment of a depiction of an approximate spherical codebook construction.

However, this transformation, albeit bounded in terms of codeword total energy since:

$$\text{trace}(SS^H) = N = \text{trace}(S^H S) \qquad \text{Eq. 14}$$

does not preserve exactly the individual unit-normality of the codewords, and thus, the codewords are not unitary anymore but approximates thereof. This approximation is tight in practice given the spectral properties of the Gram matrix of S which is M-rank. Consequently, codebooks designed generally as such do not place the codewords on the M-unit hypersphere but outline spiky realizations thereof around the spherical surface, as highlighted in FIG. 4.

In a first embodiment, offline priorly optimized spike spherical codes S(M, N, t) 402 for generic M, N without structural constraints may be compactly represented as tabulated entries stored in memory processing units containing the codebook dimensionality, e.g., M and N respectively, or alternatively M and the ratio $\alpha = N-M$ (or based on the ratio, e.g., $\alpha/M$), and the values of the codebook's codewords. The latter may be stored in their full complex floating-point representation or in space-efficient realizations such as quantized complex integer representation, quantized normalized complex integer representation.

In a second embodiment, higher-layers (e.g., RRC triggered) configurations and selection of the precoder custom spike codebook realizations may be performed based on at least one of the available information regarding the current or predicted channel state information ("CSI"), PDCP load and associated data stream or multiple data streams and their subsequent rates, latency, and reliability requirements. The higher-layer configuration and codebook setup signaling may thus consist of a bit field (e.g., one 1 bit-width field) for at least one of dynamic switch-on, one 1 bit-width field as custom codebook flag, precoder information (dimensionality and codeword values or table index of the tabulated precoder entry), as well as optional metadata on the constraints, if any, regarding latency, rate or reliability guarantees that the radio link is required to fulfil.

Some realizations may configure/indicate/provide/report dimensionality based on offset to the configured physical resources M, e.g., $\alpha = N-M$, to minimize the reporting signaling size. The enablement flags and precoder information may be required at the receiver side to resolve the precoding introduced interference and perform successful detection and subsequent decoding of information. The precoder information at the transmitter may be indicated/provided/reported to the receiver as part of a data channel embedded reference signal (e.g., based on DM-RS over PDSCH/PUSCH/PSSCH realizations) or via a control channel signaling mechanism (e.g., based on DCI for DL/UL scheduling over PDCCH, configured grant scheduling information, UCI for UL over PUCCH/PUSCH, or SCI for SL over PSCCH).

Figure 5:
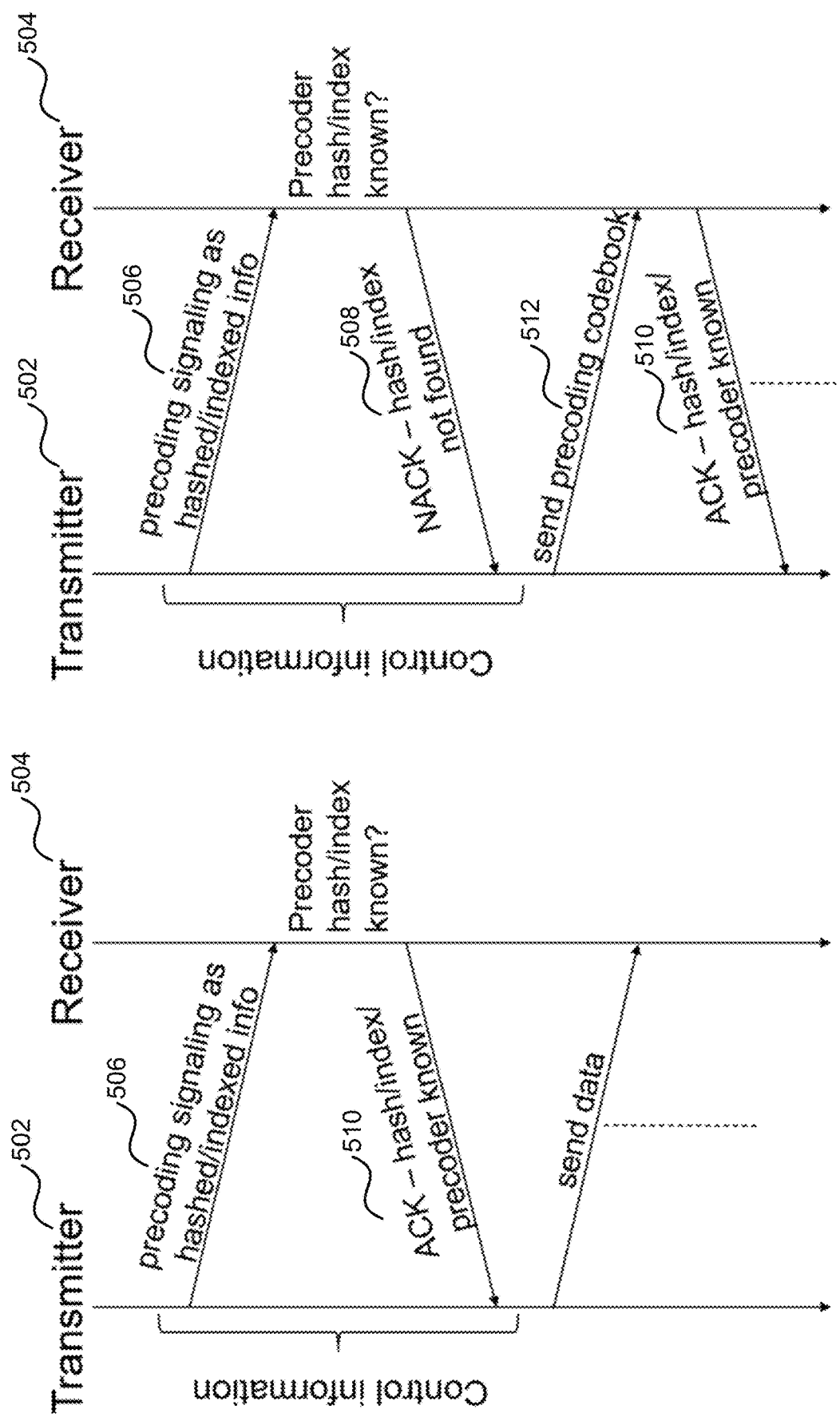
FIG. 5 is a diagram illustrating one embodiment of a protocol realization in which a transmitter configured precoder configuration is signaled to a receiver.

A third embodiment may consider the effective signaling of the precoder information to the receiver side. A simplified schematic realization of signaling this information is shown in FIG. 5. It consists of an initial signal 506 from the transmitter 502 to the receiver 504 over an appropriate control channel (e.g., PDCCH, PUCCH, PSCCH) as xCI containing a tabular index identifying the codebook. This index may be a common predefined non-decreasing integer identifying the code within a given bit mask length or, alternatively, a hash signature of the custom stored codebook. The hash function is considered set (e.g., SHA-256 etc.) or is additionally signaled according to a commonly defined reference table. The hash content is generated by the hash function applied to the entire codebook and acts as both an index and check mechanism for the receiver to determine whether its own memory storage unit contains the same realization of the codebook as the transmitter side, as inconsistencies may impact the receiver-side detection process.

In case the hash is not verified by the receiver 504, or alternatively, the receiver 504 cannot identify the transmitter 502 sent xCI-packed index of the used codebook, in one embodiment, the receiver 504 shall signal 508 this with a codebook NACK (e.g., codebook corresponding to the hash is unknown). The receiver NACK may indicate that the codebook reference was not found and thus let the transmitter know that the codebook needs to be explicitly shared. To continue with the higher-layer selected precoder, in one embodiment, the transmitter 502 signals 512 the explicit codebook to the receiver either over a control channel as a configuration field of the corresponding control information or by means of a data transmission over a (e.g., front-loaded) reference signal, e.g., a DM-RS or set of DM-RS s.

On the other hand, in one embodiment, if the receiver 504 can verify the hash or identify the codebook index based on the signaled common table of available codebooks, the receiver 504 shall simply acknowledge the codebook setup and reply 510 with a codebook ACK to the transmitter.

In an embodiment where explicit signaling of the configured codebook is required, the codebook information may be additionally compressed. Source coding compression such as algebraic or arithmetic lossless coding of the selected or pruned rows' indices may be used to reduce the necessary signaling overhead. The compression, in one embodiment, must be reported front-loaded to the actual compressed bitstream as an explicit bit field, followed by the selected source coding compression strategy to allow the retrieval of the compressed information.

In some embodiments, the indicated precoder by the transmitter is not completely known at the receiver, but related information (general precoder type/structure, or a previously used precoder version with a different dimension etc.) is known. Then, in one embodiment, the receiver requests an incremental info to be sent by the transmitter, thereby avoiding the transmission of the complete precoder information. The compressed information may be indicated/reported/provided to the receiver as part of the precoder information.

A MIMO multi-layered embodiment, in one embodiment, individually precodes each layer by the proposed codebook. Common-layer precoding configurations may be reported/indicated/provided for layer-common precoding, whereas layer-independent precoding designs may be reported/indicated/provided on a per-layer basis.

In some embodiments, the initial coding space with dimension M includes elements of subcarriers, elements of time domain symbols, elements of spatial layers, or a combination thereof.

In some embodiments, where a strong prior channel knowledge is present (e.g., a static LoS condition), the interference objective function can be defined at the transmitter from the point of view of the receiver, e.g., the precoding strategy is designed such that it minimizes the interference among the precoded sequences after the effect of the channel.

Figure 6:
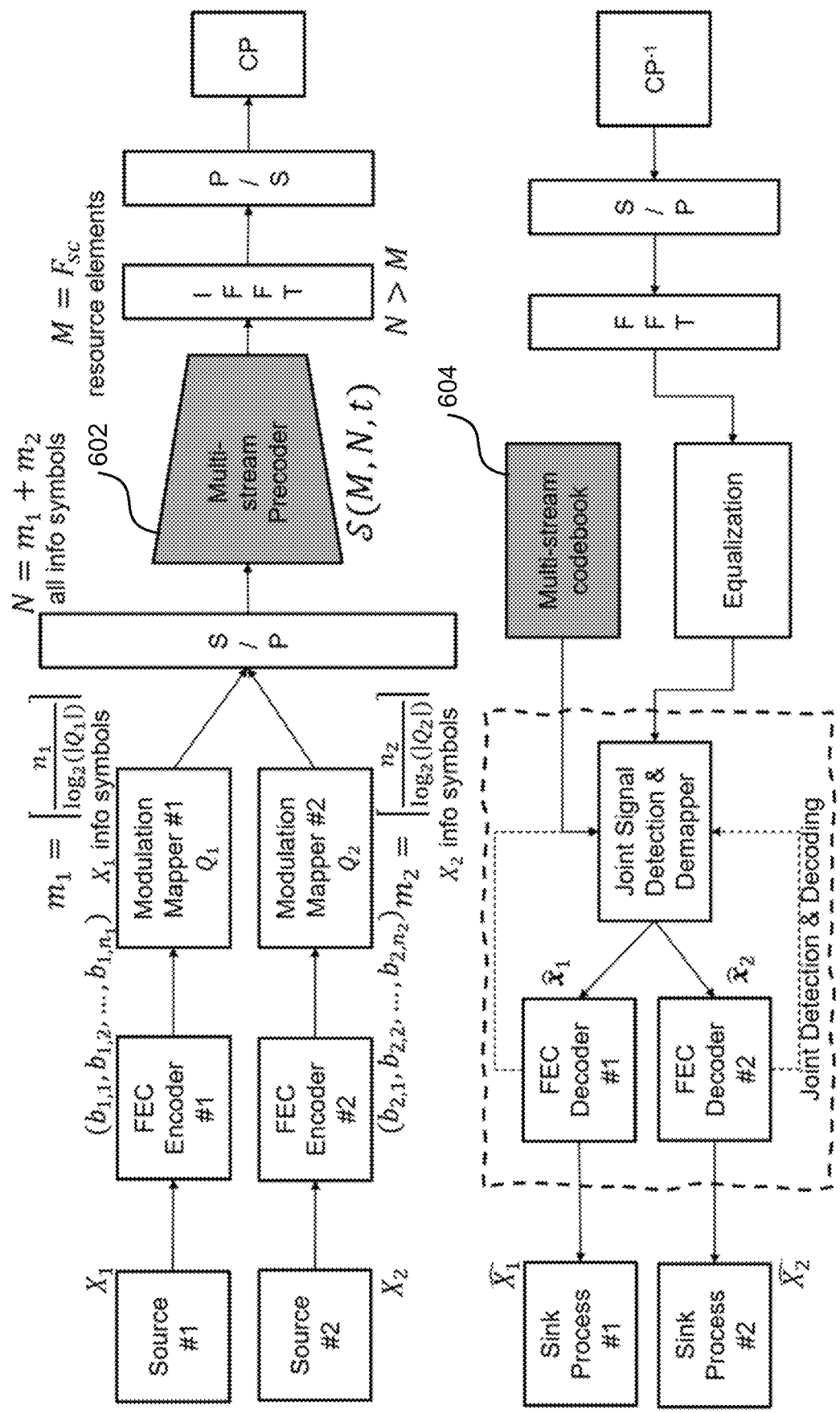
FIG. 6 is a diagram of a communications system with a transmitter (top) and a receiver (bottom) realization where two independent data streams of a transmitter are multiplexed non-orthogonally at symbol-level via a linear precoder transformation.

Regarding heterogeneous multiplexing, in one embodiment, the proposed precoder 602 has the potential to transform any P2P link into a virtual synchronous multiple access channel given the intrinsic superposition and coded combining of input information symbols. The virtual multiple access channel obtained, in one embodiment, consists in multiplexing of overloaded symbols originated from a single data stream or multiple data streams belonging to a single user, as highlighted in FIG. 6. FIG. 6 depicts a communications system (top: transmitter, bottom: receiver) realization where two independent data streams of a transmitter are multiplexed non-orthogonally at symbol-level via a linear precoder 602 transformation which virtualizes the communication link to a synchronous multiple access channel at the stream level.

Without loss of generality of the extension to multiple data streams, in one embodiment, let two independent, possible heterogeneous (e.g., in terms of rate, latency, reliability demands), data streams be transmitted over a P2P link. The symbols associated with the first data stream post encoding, rate matching, and modulation form the symbol vector:

$$x_1 = [x_1, x_2, \ldots, x_{m_1}]^T,$$

$$x_i \in Q_1 \subset \mathbb{C}^1, 0 < i \le m_1 = \left\lceil \frac{n_1}{\log_2(|Q_1|)} \right\rceil,$$

Eq. 15 given the channel coded data stream of $n_1$ bits and the selected $Q_1$ constellation set given the higher-layered configured MCS. Similarly, the symbols associated with the second data stream form the symbol vector $x_2$ as:

$$x_2 = [x_1, x_2, \ldots, x_{m_2}]^T,$$

$$x_i \in Q_2 \subset \mathbb{C}^2, 0 < i \le m_2 = \left\lceil \frac{n_2}{\log_2(|Q_2|)} \right\rceil,$$

Eq. 16

The combined symbol vector yielded by the proposed precoder spherical design is s=Sx, $x \triangleq [x_1^T, x_2^T]^T$, for a fixed design S=S(M, N, t), N=$m_1$+$m_2$ and M, the amount of orthogonal system available physical resources, e.g., frequency subcarriers, time slots, signal layers, and/or the like. Given the proposed precoding and its simultaneous and synchronous spreading of the $x_1$ and $x_2$ symbols over all the available physical resources the achievable rates of the two data streams based on the joint maximum likelihood detection strategy are:

$$R_1 \le I(X_1; Y|X_2=x_2)$$

$$R_2 \le I(X_2; Y|X_1=x_1)$$

$$R_1+R_2 \le I(X_1,X_2;Y) \qquad \text{Eq. 17}$$

where y is the channel transformed realization of s according to some channel distribution $p(y|s)$. Upon Shannon's channel capacity limit and its extension to the multiple access channel, the right-hand side upper bound of the Eq. 17 is given by the capacity of the discrete memoryless Gaussian multiple access channel as:

$$R_1 \le \log\det\left(I_M + \frac{P \cdot S_1 x_1 \cdot x_1^H S_1^H}{N_0}\right) = \log\det\left(I_M + \frac{P_{S,x_1}}{N_0}\right) \quad \text{Eq. 1S}$$

$$R_2 \le \log\det\left(I_M + \frac{P \cdot S_2 x_2 \cdot x_2^H S_2^H}{N_0}\right) = \log\det\left(I_M + \frac{P_{S,x_2}}{N_0}\right)$$

$$R_1 + R_2 \le \left(I_M + \frac{P \cdot Sx \cdot x^H S^H}{N_0}\right) = \log\det\left(I_M + \frac{P_{S,x_1} + P_{S,x_2}}{N_0}\right)$$

where the P represents the joint diagonal transmission power matrix and $S_1$, $S_2$ represent the codewords out of the codebook S 604 associated with symbols of $x_1$ and $x_2$, respectively.

The selected precoding strategy, in one embodiment, is ensemble-optimal as it diagonalizes the power spread SNR, maximizes the determinant term, and thus also maximizes the sum-rate in Eq. 18 given the design of S(M, N, t) such that $SS^H$ is uniformly diagonal. In one embodiment, this increases the overall spectral efficiency of the P2P communications link up to the Shannon limit. Furthermore, in one embodiment, additional power control and optimization schemes may be complementary embedded as the design of the power matrix P is decoupled from the codebook.

Figure 7:
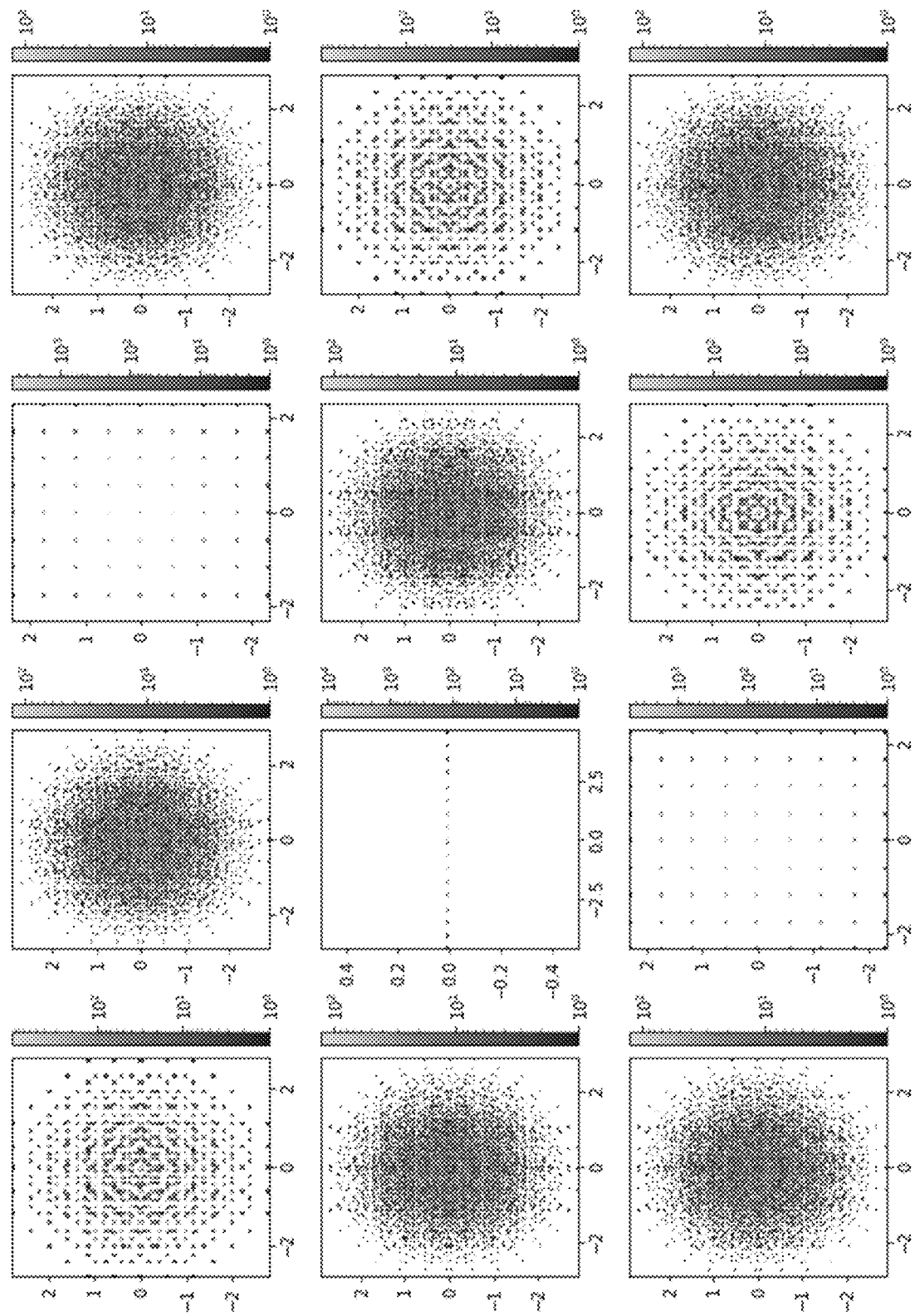
FIG. 7 is a diagram of a two-dimensional IQ histogram plots of discrete constellation points obtained post precoding with the optimal harmonic spherical codebook.

The usual capacity gap due to discrete constellation points is additionally attenuated by the proposed precoder as this acts as a combiner of input symbols in the IQ-space, and as such, performs a spatial convolution. This effect results in a constellation shaping in joint geometric and stochastic terms based on precoder realization. The precoder realizations based on antipodal designs as the harmonic spherical codes S(M, N, t) preserve the symmetry of the combined discrete constellation result, as displayed for reference in FIG. 7. For typical Q-sized PSK and/or QAM, in one embodiment, discrete constellations are normalized such that the first two moments are 0 and $\sigma^2$, respectively, the precoder thus optimally combines and represents the signal powers of heterogeneous data streams given their MCS and associated rates.

Figure 8:
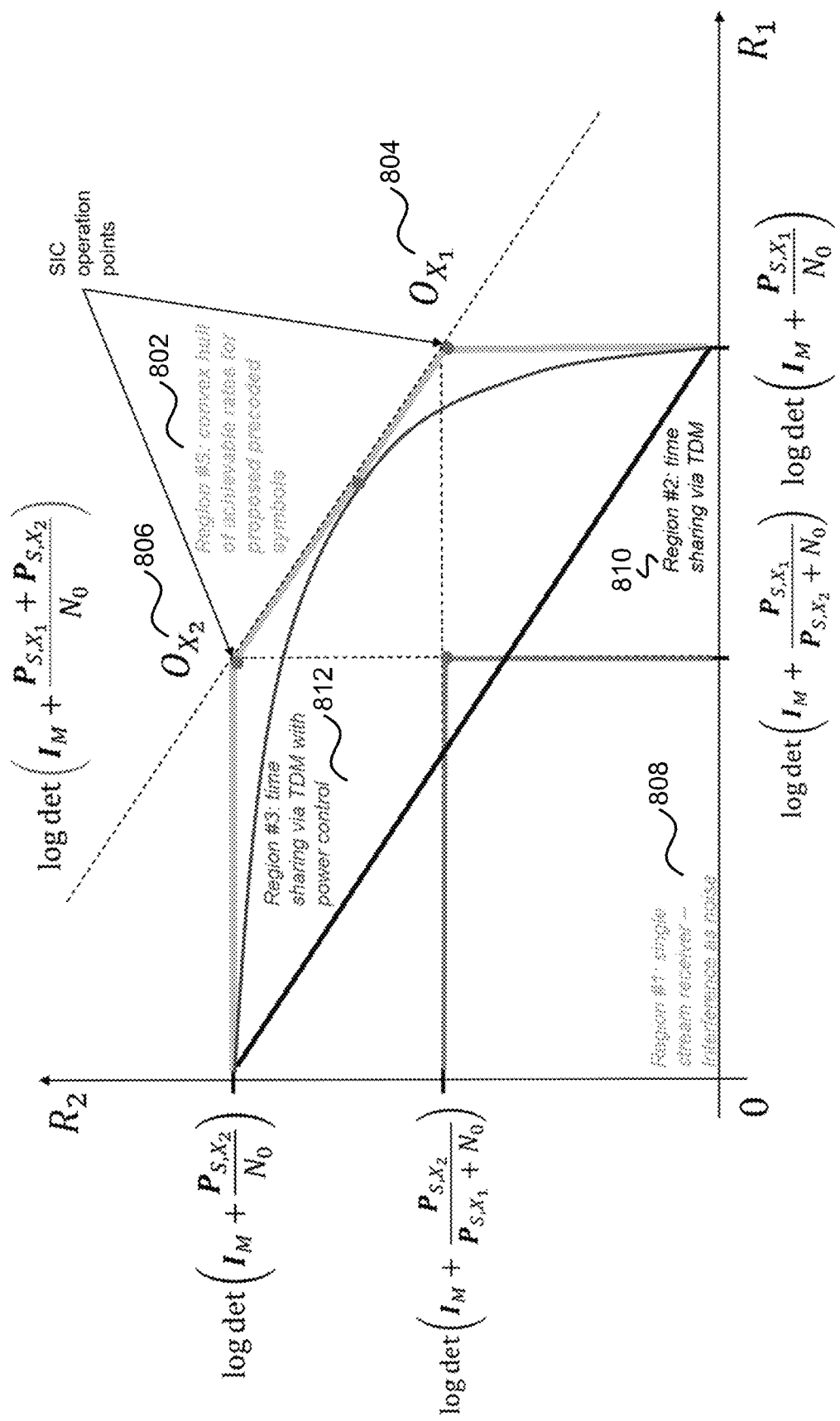
FIG. 8 is a diagram of a multi-stream capacity region of multiplexed data streams using the proposed overloaded precoding design and orthogonal access schemes and comparisons with conventional orthogonal multiplexing solutions.

The capacity region achievable by the proposed overloaded multiplexing technique is displayed in FIG. 8. The joint maximum likelihood detection scheme to decoding the individual information streams attains any rate pair within the convex hull (region S 802) and its boundaries. Alternatively, the SIC detection strategy resolves interference hierarchically by first detecting and decoding symbols in decreasing order of SNRs. This strategy, in one embodiment, achieves the corner points of operation $O_{X_1}$ 804 (if user $X_1$ is decoded first), $O_{X_2}$ 806 (if user $X_2$ is decoded first). On the other hand, conventional strategies, such as treating interference as noise typical for CDMA systems and single-user receivers, in one embodiment, would reduce spectral efficiency to region 1 808. Similarly, in one embodiment, TDM without power control would operate constrained to the boundary of region 2 810. And lastly, in one embodiment, TDM with adaptive power control (region 3 812) may achieve the sum-rate capacity at the potential costs of increased power usage above an average power constraint, additional feedback signaling regarding the CSI and prospective latency increase as at least 2 channel slots are necessary to multiplex in time domain the desired information.

One embodiment may consider the overloaded multiplexing of a single data stream at faster-than-Nyquist signaling rate given a fixed MCS and precoding setup and may be configured dynamically by higher-layers (e.g., RRC). The MCS and M physical resources selected for communication, in one embodiment, shall determine the dimensionality of the precoder realization since for any k=nR information bits transmitted at rate R and discrete input constellation set Q, the number of overloaded symbols post rate-matching is of $$N \ge \left\lceil \frac{n}{\log_2(|Q|)} \right\rceil.$$

The N codewords, in one embodiment, shall be directly mapped to the information symbols for the precoding transformation.

The precoder enablement flag and selected configuration may be periodically (with each data transmission) reported as part of data channel (e.g., front-loaded) reference signals (e.g., DM-RS) to aid the detection and decoding, or non-periodically (upon toggle or refresh of the precoder setup) as part of control channel information signals (e.g., DCI, UCI, SCI). Such a communication setup, in one embodiment, shall provide additional degrees of freedom in terms of configuration to allow a more flexible rate adaptation based on a common code rate where advantage may be taken of longer codewords and constellation shaping to increase the overall link spectral efficiency and achieve the Shannon capacity limit, or approach it closer than conventional discrete communications systems, respectively.

A second embodiment that may consider overloaded multiplexing of a single data stream at a faster-than-Nyquist signaling rate given a set of MCSs configurations and a common precoding setup, may be configured dynamically by the higher-layers (e.g., RRC) and triggered by network-level metadata information (e.g., UEP trigger). Therefore, in one embodiment, the higher layers may partition the k information bits into distinct bit sequences, each with their individual configured MCS.

Without loss of generality, in one embodiment, consider the realization where two separate rates are desired such that two TB s of lengths $k_1=n_1R_1$ and $k_2=n_2R_2$ bits are formed, with $k=k_1+k_2$, and $R_1 \le R_2$. These sequences may be served by the same HARQ or different HARQ processes. The corresponding coded bits may be mapped post rate-matching to their individually configured discrete modulation symbols sets, $Q_1$, $Q_2$. The number of overloaded symbols corresponding to the more redundant component is $$m_1 \ge \left\lceil \frac{n_1}{\log_2(|Q_1|)} \right\rceil,$$

while the second component coded at rate $R_2$ maps to $$m_2 \ge \left\lceil \frac{n_2}{\log_2(|Q_2|)} \right\rceil$$

symbols, such that the codebook size is $N=m_1+m_2$.

If the rate requirements $$R_2 \leq \log_2 \det\left(I_M + \frac{P_{S,X_2}}{N_0}\right)$$

are fulfilled, in one embodiment, more resources may be allocated (e.g., by the RRC) to the first component and increase adaptively its reliability at the rate $R_1$ by decreasing the constellation size. For adaptive configurations, in one embodiment, the precoder setup and the codewords' mapping to the information symbols of the distinct transport blocks ("TB s") for the precoding transform may be reported as an additional information field of (e.g., front-loaded) information over a data channel reference signal (e.g., DM-RS). For static configurations, this information may be reported via the control channel information signals (e.g., DCI, UCI, SCI) to reduce signaling overhead with respect to the precoder configuration and its mapping.

In a third embodiment, overloaded multiplexing of different data streams may be considered where two or more possibly uncorrelated information sources are combined by the proposed precoding. Higher layer QoS, rate, latency and reliability requirements of the data streams may be used by the RRC and lower layers to optimize and setup a joint configuration set of MCS associated with the individual data streams and a precoder configuration, respectively.

Without loss of generality, in one embodiment, consider two distinct data streams and their associated TBs each containing $k_1=n_1 R_1$ and $k_2=n_2 R_2$ information bits to be transmitted at rates $R_1$ and $R_2$, where based on the required QoS, the minimum transmission rates of $\rho_1 \leq R_1$ and $\rho_2 \leq R_2$ may be minimally necessary for each data stream to avoid outage given additional latency and reliability constraints associated with the TBs of the two streams. The instantaneous configuration optimized by the higher layers, in one embodiment, shall yield realizations where $$\left\lceil \frac{k_1}{\rho_1 \cdot \log_2(|Q_1|)} \right\rceil \geq m_1 \geq \left\lceil \frac{n_1}{\log_2(|Q_1|)} \right\rceil \text{ and}$$

$$\left\lceil \frac{k_2}{\rho_2 \cdot \log_2(|Q_2|)} \right\rceil \geq m_2 \geq \left\lceil \frac{n_2}{\log_2(|Q_2|)} \right\rceil$$

symbols are non-orthogonally multiplexed over $M < m_1 + m_2$ physical resource elements. This setup, in one embodiment, shall provide additional degrees of freedom in terms of available physical resource elements to allow for a more flexible adaptation to heterogeneous demands on rate, latency and reliability based on the precoded rate splits given the selected $m_1$ and $m_2$ for the two data streams.

A fourth embodiment may implement the proposed overloaded multiplexing of two data streams, $x_1$ which is of a first type (e.g., eMBB, associated with a first priority level), and $x_2$ which is of a second type (e.g., URLLC, associated with a second priority level, the second priority level may be higher than the first priority level), respectively. The expected rate pairs, in one embodiment, are thus $R_1 \geq R_2$ and the URLLC data symbols shall be prioritized in terms of latency and rate realization by the MAC layer relative to the eMBB data. As a result, in one embodiment, the rate splitting between the two streams may be selected such that $R_1$ is temporarily lowered down to a minimum level $q_1 \leq R_1$, which may correspond to the eMBB QoS, to allow the effective sum-rate realization $R_1+R_2$ under the maximum achievable total rate given the CSI constraints and a $R_2$ rate fulfilling the reliability requirements of the URLLC stream decoding under the available CSI SNR levels. Once the duration transmission of the URLLC TB has concluded and its TB corresponding to the HARQ process acknowledged, in one embodiment, the eMBB stream, if not already completed, shall be throttled back to a higher rate realization than $q_1$, if possible, given the updated channel conditions.

In a fifth embodiment, the joint transmission via the proposed overloaded precoding of a set of streams may be realized, out of which at least one stream, $x_1$, is of second type (e.g., URLLC) and the others, e.g., $x_2, x_3, \ldots, x_p$, represent third type (e.g., mMTC type, associated with a third priority level, the third priority level may be lower than the second priority level) of traffic. Upon prioritization of the URLLC data for latency and necessary rate $R_1$ to fulfil the reliability requirements, the gap to the achievable sum-rate given the CSI and available transmission power may be filled by mMTC symbols precoded and multiplexed spanning one or multiple coded blocks.

A sixth embodiment may treat the multiplexing realization by the proposed precoded overloading of a set of streams where one of the streams, $x_1$, corresponds to a first type (e.g., eMBB data), and the other symbols, e.g., $x_2, x_3, \ldots, x_p$, represent a third type (e.g., mMTC traffic, associated with a third priority level, the third priority level may be lower than the first priority level). The total available sum-rate of the link given the CSI conditions and total available transmit power may be split accordingly to eMBB and mMTC TBs. The eMBB traffic may be adapted between a minimum QoS-based rate $\rho_1 \leq R_1$ and its maximum achievable rate to provide additional rate overhead for transmission of mMTC TBs in case this is necessary. Otherwise, the eMBB rate, in one embodiment, shall be prioritized and mMTC traffic may be overloaded spuriously as it occurs or in batches of symbols.

Note that the realizations above, in one embodiment, depend on the selection of the precoder S(M, N, t) as the capacity gain obtained by combining the symbols is in fact an overloading gain defined by $$\gamma = \frac{N}{M}$$

as the precoded superposition of symbols increases the effective SNR given that the introduced interference can be decoded and so resolved. This latter assumption, in one embodiment, is valid in practice with modern receivers at cubic complexity in the number of information symbols to be recovered, N. Thus, a performance-complexity trade-off policy may be considered in the selection of the precoder where additional information of the receiver capabilities may be additionally utilized, if available.

Figure 9:
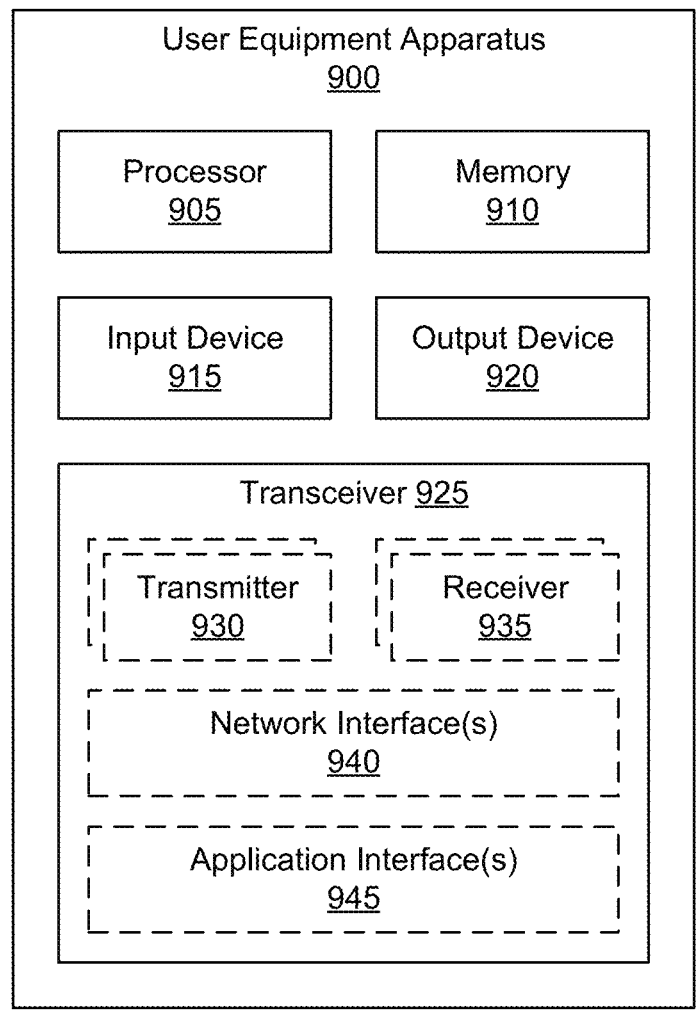
FIG. 9 is a block diagram illustrating one embodiment of a user equipment apparatus that may be used for determining a precoder for wireless communications.

FIG. 9 depicts a user equipment apparatus 900 that may be used for determining a precoder for wireless communications, according to embodiments of the disclosure. In various embodiments, the user equipment apparatus 900 is used to implement one or more of the solutions described above. The user equipment apparatus 900 may be one embodiment of the remote unit 105 and/or the UE, described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panel supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 905 may include an application processor (also known as "main processor") which manages application-domain and operating system ("OS") functions and a baseband processor (also known as "baseband radio processor") which manages radio functions.

In various embodiments, the processor 905 and transceiver 925 control the user equipment apparatus 900 to implement the above described UE behaviors. In one embodiment, the processor 905 determines a precoder for a set of modulation symbols, the determined precoder comprising a plurality of codewords and configured to reduce an ensemble interference and a pairwise interference among the plurality of codewords. In one embodiment, processor 905 precodes the set of modulation symbols based on the determined precoder. In one embodiment, the processor 905 maps the precoded set of modulation symbols to a set of physical transmission resources for a transmission layer, wherein a number of modulation symbols in the set of modulation symbols is greater than a number of physical transmission resources in the set of physical transmission resources. In one embodiment, the transceiver 925 transmits, to a receiver node, an indication of the determined precoder and the set of physical transmission resources.

In one embodiment, the precoder at least one of compresses, superpositions, and combines the set of modulation symbols. In one embodiment, the processor 905 generates a non-orthogonally multiplexed channel for the physical transmission resources by overloading the set of modulation symbols at a transmission rate that is faster than a Nyquist transmission rate.

In one embodiment, the precoder comprises a codebook of N codewords selected on a surface of a complex unit M-sphere, where M is the number of physical transmission resources and M<N. In one embodiment, the precoder codebook is based on a set of discrete harmonics on the sphere surface given by an N-th root of unity and the precoder codebook comprises an M×N truncated N-DFT linear codebook.

In one embodiment, the processor 905 selects M harmonics of the set of discrete harmonics for a compressed representation of a precoded signal space of the set of modulation symbols based on optimization criteria, wherein the optimization criteria comprise at least one of an ensemble interference magnitude and a pairwise interference magnitude given an entire search space of available discrete set of N harmonics, partially to the ensemble interference magnitude upon the selection of any M harmonics out of the available discrete set of N harmonics, and an ensemble interference magnitude and a pairwise interference magnitude over all possible harmonic and non-harmonic spherical codebook realizations by selecting any M harmonics out of an available set of N=M+1 harmonics.

In one embodiment, a configuration of the precoder codebook is based on a dimensionality and indices of at least one of the selected M harmonics and a pruned N−M set of discrete harmonics, the configuration of the determined precoder transmitted to the receiver node.

In one embodiment, the processor 905 determines the M×N linear precoding codebook based on storage of a tabulated codebook entry comprising the set of selected or pruned harmonic indices and at least two codebook dimension parameters selected from the group comprising M, N, $$\frac{N}{M},$$

N−M, and any commnation tnereof. In one embodiment, the transceiver 925 transmits an indication of a codebook index corresponding to the tabulated codebook entry of the determined precoder to the receiver node.

In one embodiment, the processor 905 determines the precoder configuration based on at least one of a rate, a latency, and a reliability of at least a portion of the set of modulation symbols, CSI wherein the CSI comprises at least a channel quality indicator ("CQI"), and channel coder type and MCS.

In one embodiment, the precoder comprises a codebook of N codewords based on complex-valued approximate spherical codes that reduce the ensemble and pairwise codeword interference magnitude yielding an M×N linear precoding codebook, the codewords approximately placed on the unit M-sphere.

In one embodiment, the processor 905 determines an M×N configuration of the linear precoding codebook based on an indexed codebook entry within a memory processing unit, the index derived on at least one of a non-decreasing index counter and a hash function representation of the codebook. In one embodiment, the processor 905 determines the precoder configuration based on at least one of a rate, a latency, and a reliability of at least a portion of the set of modulation symbols, CSI wherein the CSI comprises at least a CQI, and channel coder type and MCS.

In one embodiment, the set of modulation symbols comprises an information stream comprising at least one of a fixed coding rate and modulation configuration across a TB, a dynamic coding rate and modulation configuration across the TB, and an additional non-negative number of information streams with distinct coding rates and modulation configurations for unequal error protection.

In one embodiment, the precoded set of modulation symbols represent at least two distinct non-orthogonally and synchronously multiplexed streams of information. In one embodiment, the at least two multiplexed information streams comprise heterogeneous requirements with respect to at least one of a rate, a latency, and a reliability.

In one embodiment, the transceiver 925 transmits at least a portion of the precoder codebook information corresponding to the indicated determined precoder in response to receiving an indication of at least one of an unknown and an unverified precoder corresponding to the indicated determined precoder.

In one embodiment, the processor 905 uses one of a layer-common precoding with a same determined precoder for each transmission layer and a layer-independent precoding with different precoders determined for each transmission layer.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to determining a precoder for wireless communications. For example, the memory 910 may store various parameters, panel/beam configurations, resource assignments, policies, and the like as described above. In certain embodiments, the memory 910 also stores program code and related data, such as an operating system or other controller algorithms operating on the user equipment apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all, or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an ASIC, or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
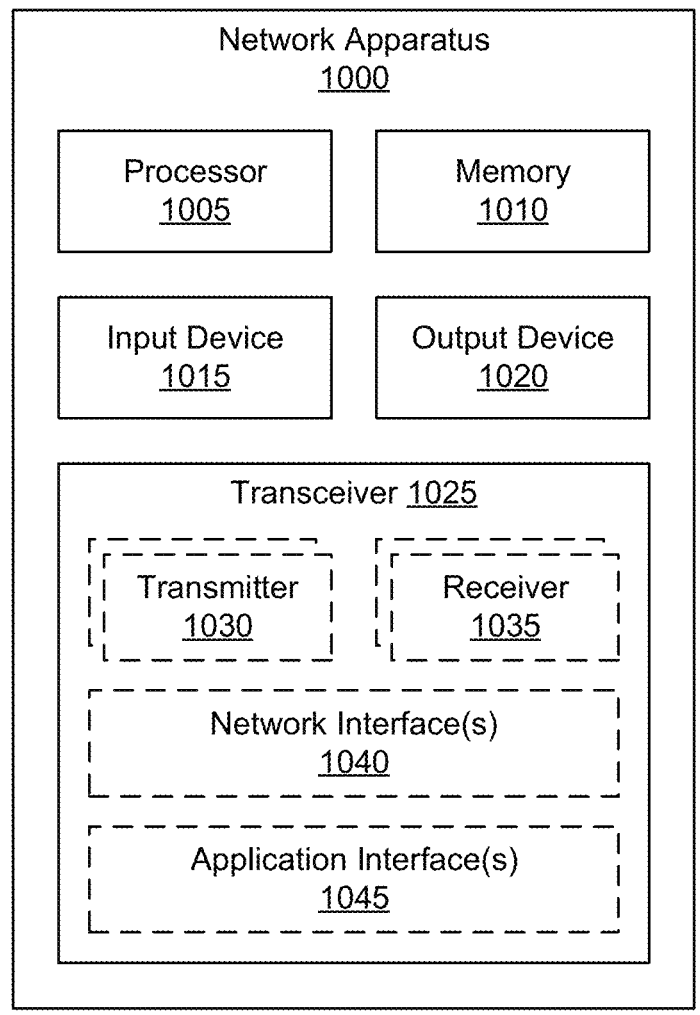
FIG. 10 is a block diagram illustrating one embodiment of a network apparatus that may be used for determining a precoder for wireless communications.

FIG. 10 depicts a network apparatus 1000 that may be used for determining a precoder for wireless communications, according to embodiments of the disclosure. In one embodiment, network apparatus 1000 may be one implementation of a RAN node, such as the base unit 121, the RAN node 120, or gNB, described above. Furthermore, the base network apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network apparatus 1000 may not include any input device 1015 and/or output device 1020. In various embodiments, the network apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025. In certain embodiments, the processor 1005 may include an application processor (also known as "main processor") which manages application-domain and operating system ("OS") functions and a baseband processor (also known as "baseband radio processor") which manages radio function.

In various embodiments, the network apparatus 1000 is a RAN node (e.g., gNB) that includes a processor 1005 and a transceiver 1025. In one embodiment, the transceiver 1025 receives an indication of a determined precoder from a transmitter node and receives a set of physical transmission resources, the physical transmission resources mapped to a set of modulation symbols that are precoded using the determined precoder. In one embodiment, the processor 1005 uses the determined precoder and the set of physical transmission resources for transmissions between the receiver node and the transmitter node.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to determining a precoder for wireless communications. For example, the memory 1010 may store parameters, configurations, resource assignments, policies, and the like, as described above. In certain embodiments, the memory 1010 also stores program code and related data, such as an operating system or other controller algorithms operating on the network apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all, or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least one transmitter 1030 and at least one receiver 1035. One or more transmitters 1030 may be used to communicate with the UE, as described herein. Similarly, one or more receivers 1035 may be used to communicate with network functions in the non-public network ("NPN"), PLMN and/or RAN, as described herein. Although only one transmitter 1030 and one receiver 1035 are illustrated, the network apparatus 1000 may have any suitable number of transmitters 1030 and receivers 1035. Further, the transmitter(s) 1030 and the receiver(s) 1035 may be any suitable type of transmitters and receivers.

Figure 11:
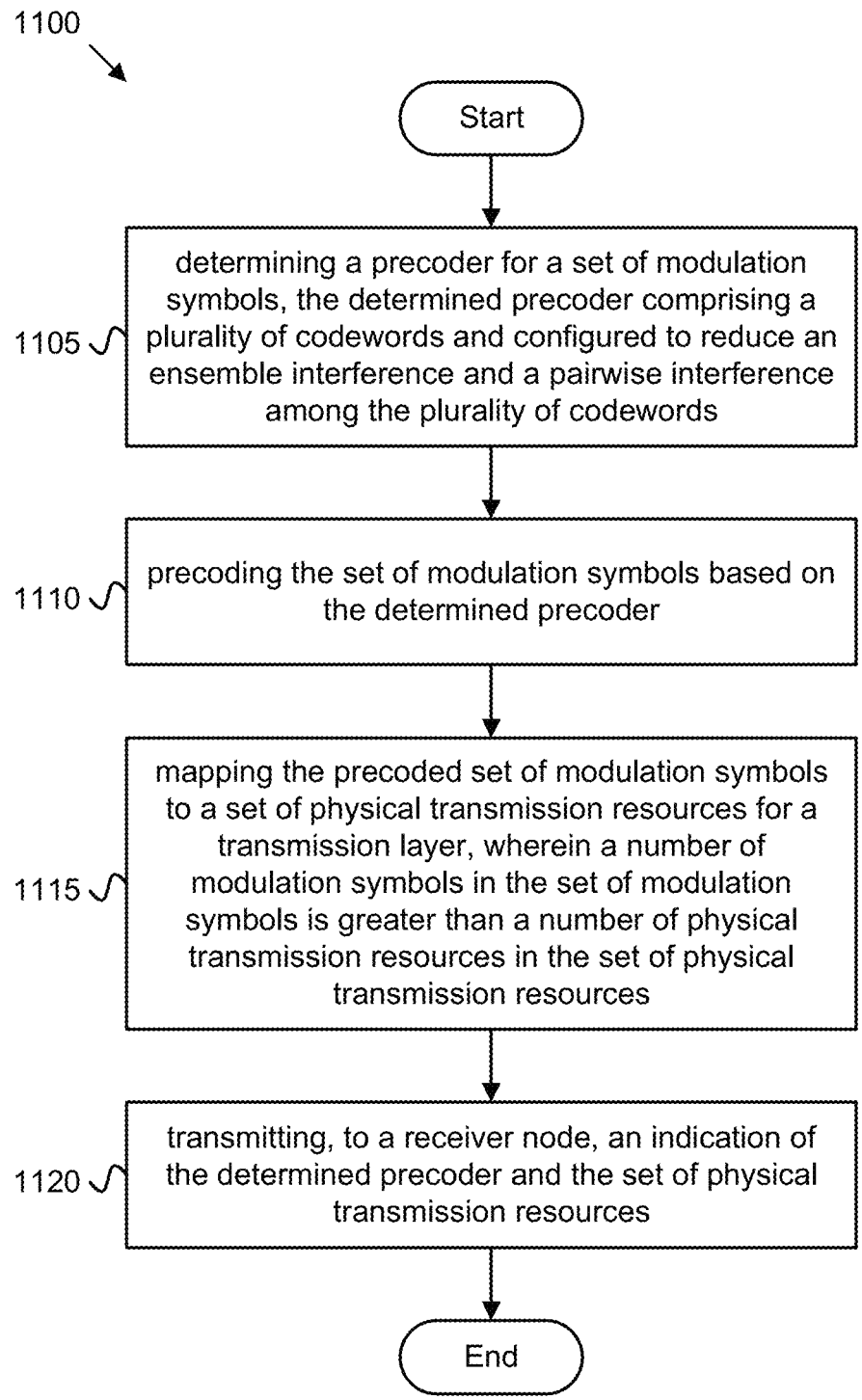
FIG. 11 is a flowchart diagram illustrating one embodiment of a method for determining a precoder for wireless communications.

FIG. 11 is a flowchart diagram of a method 1100 for determining a precoder for wireless communications. The method 1100 may be performed by a transmitter node such as a UE as described herein, for example, the remote unit 105, the UE and/or the user equipment apparatus 900 and/or a network entity such as a base node, a gNB, and/or the network equipment apparatus 1000. In some embodiments, the method 1100 may be performed by a processor executing program code, for example, a microcontroller, a microprocessor, a CPU, a GPU, an auxiliary processing unit, a FPGA, or the like.

In one embodiment, the method 1100 includes determining 1105 a precoder for a set of modulation symbols, the determined precoder comprising a plurality of codewords and configured to reduce an ensemble interference and a pairwise interference among the plurality of codewords. In one embodiment, the method 1100 includes precoding 1110 the set of modulation symbols based on the determined precoder. In one embodiment, the method 1100 includes mapping 1115 the precoded set of modulation symbols to a set of physical transmission resources for a transmission layer, wherein a number of modulation symbols in the set of modulation symbols is greater than a number of physical transmission resources in the set of physical transmission resources. In one embodiment, the method 1100 includes transmitting 1120, to a receiver node, an indication of the determined precoder and the set of physical transmission resources, and the method 1100 ends.

Figure 12:
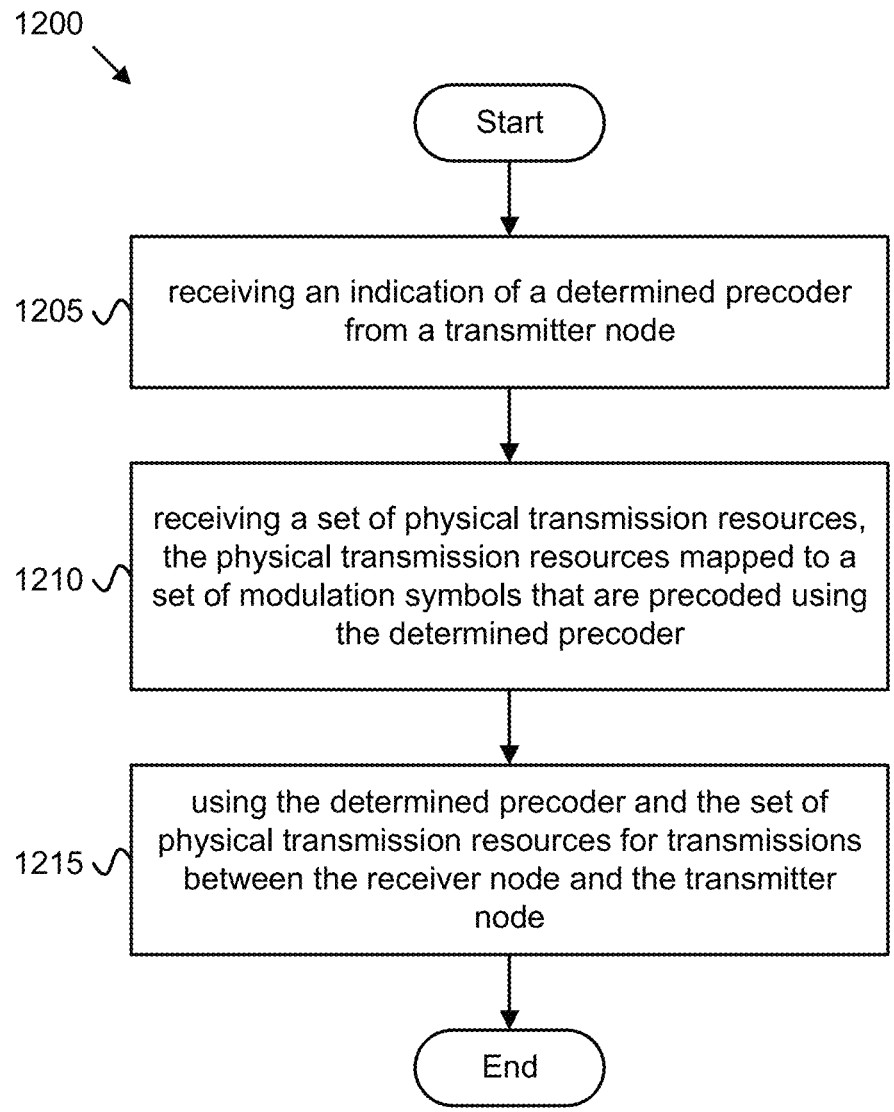
FIG. 12 is a flowchart diagram illustrating one embodiment of another method for determining a precoder for wireless communications.

FIG. 12 is a flowchart diagram of a method 1200 for determining a precoder for wireless communications. The method 1200 may be performed by a receiver node such as a UE as described herein, for example, the remote unit 105, the UE and/or the user equipment apparatus 900 and/or a network entity such as a base node, a gNB, and/or the network equipment apparatus 1000. In some embodiments, the method 1200 may be performed by a processor executing program code, for example, a microcontroller, a microprocessor, a CPU, a GPU, an auxiliary processing unit, a FPGA, or the like.

In one embodiment, the method 1200 includes receiving 1205 an indication of a determined precoder from a transmitter node. In one embodiment, the method 1200 includes receiving 1210 a set of physical transmission resources, the physical transmission resources mapped to a set of modulation symbols that are precoded using the determined precoder. In one embodiment, the method 1200 includes using 1215 the determined precoder and the set of physical transmission resources for transmissions between the receiver node and the transmitter node, and the method 1200 ends.

A first apparatus is disclosed for determining a precoder for wireless communications. The first apparatus may include a transmitter node such as a UE as described herein, for example, the remote unit 105, the UE and/or the user equipment apparatus 900 and/or a network entity such as a base node, a gNB, and/or the network equipment apparatus 1000. In some embodiments, the first apparatus may include a processor executing program code, for example, a microcontroller, a microprocessor, a CPU, a GPU, an auxiliary processing unit, a FPGA, or the like.

In one embodiment, the first apparatus includes a processor that determines a precoder for a set of modulation symbols, the determined precoder comprising a plurality of codewords and configured to reduce an ensemble interference and a pairwise interference among the plurality of codewords. In one embodiment, the processor precodes the set of modulation symbols based on the determined precoder. In one embodiment, the processor maps the precoded set of modulation symbols to a set of physical transmission resources for a transmission layer, wherein a number of modulation symbols in the set of modulation symbols is greater than a number of physical transmission resources in the set of physical transmission resources. In one embodiment, the first apparatus includes a transceiver that transmits, to a receiver node, an indication of the determined precoder and the set of physical transmission resources.

In one embodiment, the precoder at least one of compresses, superpositions, and combines the set of modulation symbols. In one embodiment, the processor generates a non-orthogonally multiplexed channel for the physical transmission resources by overloading the set of modulation symbols at a transmission rate that is faster than a Nyquist transmission rate.

In one embodiment, the precoder comprises a codebook of N codewords selected on a surface of a complex unit M-sphere, where M is the number of physical transmission resources and M<N. In one embodiment, the precoder codebook is based on a set of discrete harmonics on the sphere surface given by an N-th root of unity and the precoder codebook comprises an M×N truncated N-DFT linear codebook.

In one embodiment, the processor selects M harmonics of the set of discrete harmonics for a compressed representation of a precoded signal space of the set of modulation symbols based on optimization criteria, wherein the optimization criteria comprise at least one of an ensemble interference magnitude and a pairwise interference magnitude given an entire search space of available discrete set of N harmonics, partially to the ensemble interference magnitude upon the selection of any M harmonics out of the available discrete set of N harmonics, and an ensemble interference magnitude and a pairwise interference magnitude over all possible harmonic and non-harmonic spherical codebook realizations by selecting any M harmonics out of an available set of N=M+1 harmonics.

In one embodiment, a configuration of the precoder codebook is based on a dimensionality and indices of at least one of the selected M harmonics and a pruned N−M set of discrete harmonics, the configuration of the determined precoder transmitted to the receiver node.

In one embodiment, the processor determines the M×N linear precoding codebook based on storage of a tabulated codebook entry comprising the set of selected or pruned harmonic indices and at least two codebook dimension parameters selected from the group comprising M, N, N/M, N−M, and any combination thereof. In one embodiment, the transceiver transmits an indication of a codebook index corresponding to the tabulated codebook entry of the determined precoder to the receiver node.

In one embodiment, the processor determines the precoder configuration based on at least one of a rate, a latency, and a reliability of at least a portion of the set of modulation symbols, CSI wherein the CSI comprises at least a CQI, and channel coder type and MCS.

In one embodiment, the precoder comprises a codebook of N codewords based on complex-valued approximate spherical codes that reduce the ensemble and pairwise codeword interference magnitude yielding an M×N linear precoding codebook, the codewords approximately placed on the unit M-sphere.

In one embodiment, the processor determines an M×N configuration of the linear precoding codebook based on an indexed codebook entry within a memory processing unit, the index derived on at least one of a non-decreasing index counter and a hash function representation of the codebook. In one embodiment, the processor determines the precoder configuration based on at least one of a rate, a latency, and a reliability of at least a portion of the set of modulation symbols, CSI wherein the CSI comprises at least a CQI, and channel coder type and MCS.

In one embodiment, the set of modulation symbols comprises an information stream comprising at least one of a fixed coding rate and modulation configuration across a TB, a dynamic coding rate and modulation configuration across the TB, and an additional non-negative number of information streams with distinct coding rates and modulation configurations for unequal error protection.

In one embodiment, the precoded set of modulation symbols represent at least two distinct non-orthogonally and synchronously multiplexed streams of information. In one embodiment, the at least two multiplexed information streams comprise heterogeneous requirements with respect to at least one of a rate, a latency, and a reliability.

In one embodiment, the transceiver transmits at least a portion of the precoder codebook information corresponding to the indicated determined precoder in response to receiving an indication of at least one of an unknown and an unverified precoder corresponding to the indicated determined precoder.

In one embodiment, the processor uses one of a layer-common precoding with a same determined precoder for each transmission layer and a layer-independent precoding with different precoders determined for each transmission layer.

A first method is disclosed for determining a precoder for wireless communications. The first method may be performed by a transmitter node such as a UE as described herein, for example, the remote unit 105, the UE and/or the user equipment apparatus 900 and/or a network entity such as a base node, a gNB, and/or the network equipment apparatus 1000. In some embodiments, the first method may be performed by a processor executing program code, for example, a microcontroller, a microprocessor, a CPU, a GPU, an auxiliary processing unit, a FPGA, or the like.

In one embodiment, the first method includes determining a precoder for a set of modulation symbols, the determined precoder comprising a plurality of codewords and configured to reduce an ensemble interference and a pairwise interference among the plurality of codewords. In one embodiment, the first method includes precoding the set of modulation symbols based on the determined precoder. In one embodiment, the first method includes mapping the precoded set of modulation symbols to a set of physical transmission resources for a transmission layer, wherein a number of modulation symbols in the set of modulation symbols is greater than a number of physical transmission resources in the set of physical transmission resources. In one embodiment, the first method includes transmitting, to a receiver node, an indication of the determined precoder and the set of physical transmission resources.

In one embodiment, the precoder at least one of compresses, superpositions, and combines the set of modulation symbols. In one embodiment, the first method includes generating a non-orthogonally multiplexed channel for the physical transmission resources by overloading the set of modulation symbols at a transmission rate that is faster than a Nyquist transmission rate.

In one embodiment, the precoder comprises a codebook of N codewords selected on a surface of a complex unit M-sphere, where M is the number of physical transmission resources and M<N. In one embodiment, the precoder codebook is based on a set of discrete harmonics on the sphere surface given by an N-th root of unity and the precoder codebook comprises an M×N truncated N-DFT linear codebook.

In one embodiment, the first method includes selecting M harmonics of the set of discrete harmonics for a compressed representation of a precoded signal space of the set of modulation symbols based on optimization criteria, wherein the optimization criteria comprise at least one of an ensemble interference magnitude and a pairwise interference magnitude given an entire search space of available discrete set of N harmonics, partially to the ensemble interference magnitude upon the selection of any M harmonics out of the available discrete set of N harmonics, and an ensemble interference magnitude and a pairwise interference magnitude over all possible harmonic and non-harmonic spherical codebook realizations by selecting any M harmonics out of an available set of N=M+1 harmonics.

In one embodiment, a configuration of the precoder codebook is based on a dimensionality and indices of at least one of the selected M harmonics and a pruned N−M set of discrete harmonics, the configuration of the determined precoder transmitted to the receiver node.

In one embodiment, the first method includes determining the M×N linear precoding codebook based on storage of a tabulated codebook entry comprising the set of selected or pruned harmonic indices and at least two codebook dimension parameters selected from the group comprising M, N, $$\frac{N}{M},$$

N−M, and any comumation thereof. In one embodiment, the first method includes transmitting an indication of a codebook index corresponding to the tabulated codebook entry of the determined precoder to the receiver node.

In one embodiment, the first method includes determining the precoder configuration based on at least one of a rate, a latency, and a reliability of at least a portion of the set of modulation symbols, CSI wherein the CSI comprises at least a CQI, and channel coder type and MCS.

In one embodiment, the precoder comprises a codebook of N codewords based on complex-valued approximate spherical codes that reduce the ensemble and pairwise codeword interference magnitude yielding an M×N linear precoding codebook, the codewords approximately placed on the unit M-sphere.

In one embodiment, the first method includes determining an M×N configuration of the linear precoding codebook based on an indexed codebook entry within a memory processing unit, the index derived on at least one of a non-decreasing index counter and a hash function representation of the codebook. In one embodiment, the first method includes determining the precoder configuration based on at least one of a rate, a latency, and a reliability of at least a portion of the set of modulation symbols, CSI wherein the CSI comprises at least a CQI, and channel coder type and MCS.

In one embodiment, the set of modulation symbols comprises an information stream comprising at least one of a fixed coding rate and modulation configuration across a TB, a dynamic coding rate and modulation configuration across the TB, and an additional non-negative number of information streams with distinct coding rates and modulation configurations for unequal error protection.

In one embodiment, the precoded set of modulation symbols represent at least two distinct non-orthogonally and synchronously multiplexed streams of information. In one embodiment, the at least two multiplexed information streams comprise heterogeneous requirements with respect to at least one of a rate, a latency, and a reliability.

In one embodiment, the first method includes transmitting at least a portion of the precoder codebook information corresponding to the indicated determined precoder in response to receiving an indication of at least one of an unknown and an unverified precoder corresponding to the indicated determined precoder.

In one embodiment, the first method includes using one of a layer-common precoding with a same determined precoder for each transmission layer and a layer-independent precoding with different precoders determined for each transmission layer.

A second apparatus is disclosed for determining a precoder for wireless communications. The second apparatus may include a receiver node such as a UE as described herein, for example, the remote unit 105, the UE and/or the user equipment apparatus 900 and/or a network entity such as a base node, a gNB, and/or the network equipment apparatus 1000. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver that receives an indication of a determined precoder from a transmitter node and receives a set of physical transmission resources, the physical transmission resources mapped to a set of modulation symbols that are precoded using the determined precoder. In one embodiment, the second apparatus includes a processor that uses the determined precoder and the set of physical transmission resources for transmissions between the receiver node and the transmitter node.

A second method is disclosed for determining a precoder for wireless communications. The second method may be performed by a receiver node such as a UE as described herein, for example, the remote unit 105, the UE and/or the user equipment apparatus 900 and/or a network entity such as a base node, a gNB, and/or the network equipment apparatus 1000. In some embodiments, the second method may be performed by a processor executing program code, for example, a microcontroller, a microprocessor, a CPU, a GPU, an auxiliary processing unit, a FPGA, or the like.

In one embodiment, the second method includes receiving an indication of a determined precoder from a transmitter node. In one embodiment, the second method includes receiving a set of physical transmission resources, the physical transmission resources mapped to a set of modulation symbols that are precoded using the determined precoder. In one embodiment, the second method includes using the determined precoder and the set of physical transmission resources for transmissions between the receiver node and the transmitter node.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network equipment (NE) for wireless communication, comprising:
at least one memory; and
at least one processor coupled with the at least one memory and configured to cause the NE to:
determine a precoder for a set of modulation symbols, the set of modulation symbols representing at least two distinct multiplexed streams of information, the precoder comprising a plurality of codewords and configured to reduce an ensemble interference and a pairwise interference for the plurality of codewords;
precode the set of modulation symbols based on the precoder;
map the precoded set of modulation symbols to a set of resources, wherein a number of modulation symbols of the set of modulation symbols is greater than a number of resources in the set of resources;
generate a non-orthogonal multiplexed channel for access to the set of resources by overloading the set of modulation symbols at a transmission rate that is greater than a Nyquist rate; and
transmit an indication of the precoder and the set of resources.

2. The NE of claim 1, wherein the precoder compresses the set of modulation symbols, superpositions the set of modulation symbols, or combines the set of modulation symbols, or a combination thereof.

3. The NE of claim 1, wherein the precoder comprises a codebook of N codewords selected on a surface of a complex unit M-sphere, where M is the number of resources and M<N.

4. The NE of claim 3, wherein the codebook is based on a set of discrete harmonics on the surface of the complex unit M-sphere given by an N-th root of unity and the codebook comprises an M×N truncated N-Discrete Fourier Transform (N-DFT) linear codebook.

5. The NE of claim 4, wherein the at least one processor is configured to cause the NE to:
select M harmonics of the set of discrete harmonics for a compressed representation of a precoded signal space of the set of modulation symbols based on a criteria, wherein the criteria comprise at least one of:
an ensemble interference magnitude and a pairwise interference magnitude for an entire search space of available discrete set of N harmonics;
partially to the ensemble interference magnitude upon the selection of any M harmonics out of the available discrete set of N harmonics; or
the ensemble interference magnitude and the pairwise interference magnitude for all possible harmonic and non-harmonic spherical codebook realizations by selecting any M harmonics of an available set of N=M+1 harmonics.

6. The NE of claim 5, wherein a configuration of the codebook is based on a dimensionality and indices of at least one of the selected M harmonics and a pruned N−M set of discrete harmonics.

7. The NE of claim 6, wherein the at least one processor is configured to cause the NE to:
determine the M×N truncated N-DFT linear codebook based on storage of a tabulated codebook entry comprising the set of M harmonics and at least two codebook dimension parameters selected from the group comprising M, N, $$\frac{N}{M},$$

N−M, or any combination thereof; and
transmit a second indication of a codebook index corresponding to the tabulated codebook entry of the precoder.

8. The NE of claim 6, wherein the at least one processor is configured to cause the NE to:
a rate, a latency, and a reliability of at least a portion of the set of modulation symbols;
channel state information ("CSI") comprising at least a channel quality indicator ("CQI"); or
a channel coder type and a modulation and coding scheme ("MCS").

9. The NE of claim 1, wherein the precoder comprises a codebook of N codewords based on complex-valued approximate spherical codes that reduce the ensemble interference and pairwise codeword interference magnitude yielding an M×N linear precoding codebook, the N codewords positioned on a unit M-sphere.

10. The NE of claim 9, wherein the at least one processor is configured to cause the NE to determine an M×N configuration of the M×N linear precoding codebook based on an indexed codebook entry, the indexed codebook entry derived on at least one of a non-decreasing index counter and a hash function representation of the M×N linear precoding codebook.

11. The NE of claim 9, wherein to determine the precoder is further based on at least one of:
a rate, a latency, and a reliability of at least a portion of the set of modulation symbols;
channel state information ("CSI") comprising at least a channel quality indicator ("CQI"); or
a channel coder type and a modulation and coding scheme ("MCS").

12. The NE of claim 1, wherein the set of modulation symbols comprises an information stream comprising at least one of:
a fixed coding rate and a modulation configuration across a transmission block ("TB");
a dynamic coding rate and a modulation configuration across the TB; or
an additional non-negative number of information streams with distinct coding rates and modulation configurations for unequal error protection.

13. The NE of claim 1, wherein the at least two distinct multiplexed streams of information correspond to at least two service data flows comprising services of enhanced mobile broadband (eMBB), ultra-reliable low-latency communications (URLLC), massive machine-type communications, or a combination thereof.

14. The NE of claim 1, wherein the at least two distinct multiplexed streams of information comprise heterogeneous requirements associated with at least one of a rate, a latency, or a reliability.

15. The NE of claim 1, wherein the at least one processor is configured to cause the NE to transmit the indication of the precoder based on one or more reference signals over one or more control channels or data channels.

16. The NE of claim 1, wherein the at least one processor is configured to cause the NE to transmit at least a portion of a precoder codebook information corresponding to the precoder in response to receiving a second indication of at least one of an unknown or an unverified precoder corresponding to the precoder.

17. The NE of claim 1, wherein the at least one processor is configured to cause the NE to use one of:
a layer-common precoding with a same determined precoder for each transmission layer; and
a layer-independent precoding with different precoders determined for each transmission layer.

18. A processor for wireless communication, comprising:
at least one controller coupled with at least one memory and configured to cause the processor to:
determine a precoder for a set of modulation symbols, the set of modulation symbols representing at least two distinct multiplexed streams of information, the precoder comprising a plurality of codewords and configured to reduce an ensemble interference and a pairwise interference for the plurality of codewords;
precode the set of modulation symbols based on the precoder;
map the set of modulation symbols to a set of resources, wherein a number of modulation symbols of the set of modulation symbols is greater than a number of resources in the set of resources;
generate a non-orthogonal multiplexed channel for access to the set of resources by overloading the set of modulation symbols at a transmission rate that is greater than a Nyquist rate; and
transmit an indication of the precoder and the set of resources.

19. A method performed by a network equipment (NE), the method comprising:
determining a precoder for a set of modulation symbols, the set of modulation symbols representing at least two distinct multiplexed streams of information, the precoder comprising a plurality of codewords and configured to reduce an ensemble interference and a pairwise interference for the plurality of codewords;
precoding the set of modulation symbols based on the precoder;
mapping the set of modulation symbols to a set of resources, wherein a number of modulation symbols of the set of modulation symbols is greater than a number of resources in the set of resources;
generating a non-orthogonal multiplexed channel for access to the set of resources by overloading the set of modulation symbols at a transmission rate that is greater than a Nyquist rate; and
transmitting an indication of the precoder and the set of resources.

20. A user equipment (UE) for wireless communication, comprising:
at least one memory; and
at least one processor coupled with the at least one memory and configured to cause the UE to:
receive an indication of a precoder for a set of modulation symbols, the set of modulation symbols representing at least two distinct multiplexed streams of information;
receive a set of resources, the set of resources mapped to the set of modulation symbols that are precoded using the precoder, the set of modulation symbols overloaded at a rate that is greater than a Nyquist rate based at least in part on the precoder generating a non-orthogonal multiplexed channel for the set of resources; and
use the precoder and the set of resources for transmissions.

* * * * *